(12) United States Patent
Kashiwagi et al.

(10) Patent No.: US 7,572,203 B2
(45) Date of Patent: Aug. 11, 2009

(54) AUTOMATIC TRANSMISSION SYSTEM AND METHOD FOR CONTROLLING AUTOMATIC TRANSMISSION APPARATUS

(75) Inventors: Tomoyuki Kashiwagi, Chita-gun (JP); Haruki Matsuzaki, Obu (JP); Masashi Hori, Anjo (JP)

(73) Assignee: DENSO Corporation, Kariya (JP)

( * ) Notice: Subject to any disclaimer, the term of this patent is extended or adjusted under 35 U.S.C. 154(b) by 412 days.

(21) Appl. No.: 11/441,203

(22) Filed: May 26, 2006

(65) Prior Publication Data

US 2006/0276300 A1 Dec. 7, 2006

(30) Foreign Application Priority Data

Jun. 6, 2005 (JP) .............................. 2005-165975

(51) Int. Cl.
*B60W 50/02* (2006.01)
(52) U.S. Cl. .............................. 477/34; 477/907; 74/335
(58) Field of Classification Search .................. 477/907
See application file for complete search history.

(56) References Cited

U.S. PATENT DOCUMENTS

| | | | |
|---|---|---|---|
| 5,510,982 A | 4/1996 | Ohnishi et al. | |
| 5,925,087 A | 7/1999 | Ohnishi et al. | |
| 2003/0222617 A1 | 12/2003 | Nakai et al. | |
| 2003/0227287 A1* | 12/2003 | Hori et al. | 324/207.25 |
| 2004/0162661 A1 | 8/2004 | Kikuchi | |
| 2006/0033464 A1 | 2/2006 | Nakai et al. | |

FOREIGN PATENT DOCUMENTS

| | | |
|---|---|---|
| JP | 3-186657 | 8/1991 |
| JP | 2002-323127 | 11/2002 |
| JP | 2003-130209 | 5/2003 |
| JP | 2005-024044 | 1/2005 |

OTHER PUBLICATIONS

German Office Action dated Feb. 28, 2008 issued in counterpart German Application No. 102006026216.6-14 with English translation.

Examination Report issued on Sep. 17, 2008 in corresponding Japanese Application No. 2005-165975 with an at least partial English-language translation thereof.

* cited by examiner

*Primary Examiner*—Richard M. Lorence
*Assistant Examiner*—Edwin A. Young
(74) *Attorney, Agent, or Firm*—Nixon & Vanderhye P.C.

(57) ABSTRACT

An SBW storage of an SBW controller stores a rotational angular position of an output shaft of an electric actuator. When the SBW controller is restarted due to instantaneous power interruption, the SBW controller maintains and uses the current angular position of the output shaft, which is stored in the SBW storage device, as a latest rotational angular position of the output shaft that is used to drive a shift range change mechanism upon satisfaction of the following conditions: the electric motor has not been driven before the instantaneous power interruption, and the current rotational angular position of the output shaft, which is stored in the SBW storage device, is not destroyed.

14 Claims, 9 Drawing Sheets

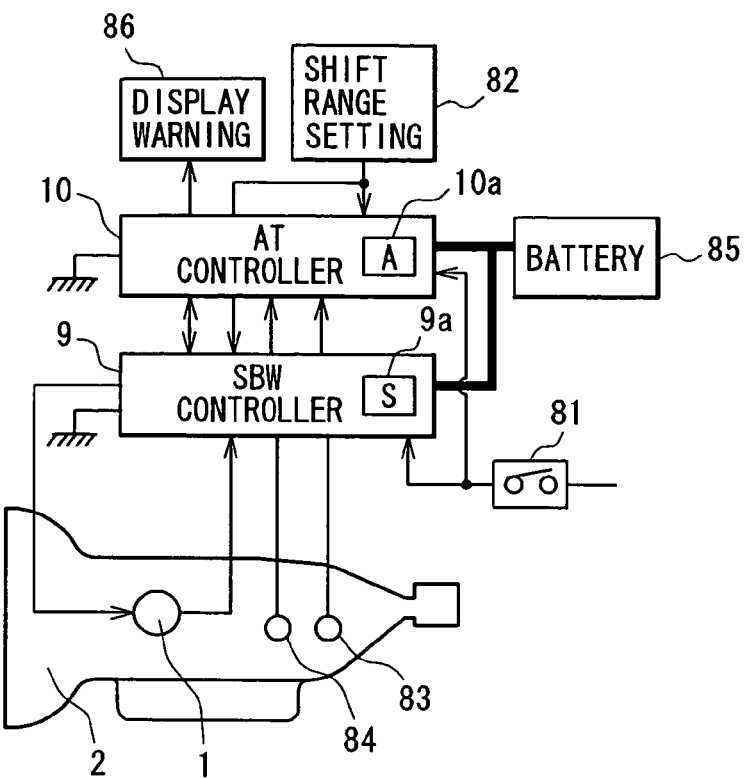
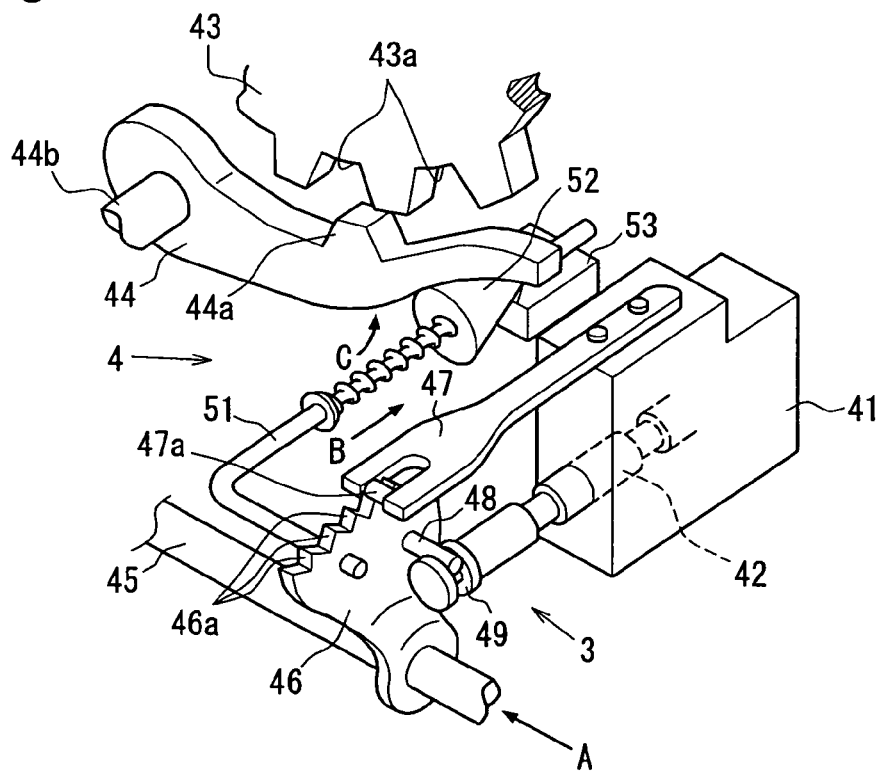

| ROTATIONAL DIRECTION | ① | DETERMINED POSITION | SFAFT POSITION A |
|---|---|---|---|
| P DIRECTION | P/N | D | N |
| | | N | N |
| | | R | P |
| | D/R | D | D |
| | | N | R |
| | | R | R |
| D DIRECTION | P/N | N | N |
| | | R | N |
| | | P | P |
| | D/R | N | D |
| | | R | R |
| | | P | R |

AUTOMATIC TRANSMISSION SYSTEM AND METHOD FOR CONTROLLING AUTOMATIC TRANSMISSION APPARATUS

CROSS REFERENCE TO RELATED APPLICATION

This application is based on and incorporates herein by reference Japanese Patent Application No. 2005-165975 filed on Jun. 6, 2005.

BACKGROUND OF THE INVENTION

1. Field of the Invention

The present invention relates to an automatic transmission system having an automatic transmission apparatus and a method for controlling the automatic transmission apparatus.

2. Description of Related Art

An electric shift range change apparatus, which changes a shift range change mechanism of an automatic transmission apparatus through use of an electric actuator, has been proposed (see, for example, Japanese Unexamined Patent Publication No. H03-186657 and Japanese Unexamined Patent Publication No. 2004-56858 corresponding to US2003/0222617A1 and US2006/0033464A1).

In this electric shift range change apparatus, there is no mechanical connection between a shift range setting device, i.e., a shift range setting means (e.g., a mechanical shift lever operated switch, a shift range setting button, a joystick) and a shift range change mechanism (a mechanism that mechanically slides a manual spool valve, which changes a hydraulic pressure according to a shift range at hydraulic pressure controller). Thus, there is a high degree of freedom in terms of positioning of the shift range setting device and the shift range change mechanism in the vehicle.

Furthermore, since there is no mechanical connection between the shift range setting device and the shift range change mechanism, the shift range setting device can be freely designed regardless of the structure of the shift range change mechanism. Thus, it is possible to design the easy-to-operate shift range setting device in view of the ergonomics. Furthermore, the user may possibly replace the current shift range setting device with a more appropriate shift range setting device based on the situation.

The SBW controller controls the electric actuator based on the range demand value, which is outputted from the shift range setting device, to change the actual shift range.

The SBW controller is an electronic controller, which needs electric power for its operation. Thus, an instantaneous power interruption or failure (an instantaneous stop of the power supply) of the SBW controller may possibly occur due to some unexpected reason (e.g., unexpected electrical contact malfunctioning).

In the case of the mechanical shift range change apparatus, which changes the shift range of the automatic transmission apparatus through a mechanical transmission mechanism, such as a wire, a rod, the selected shift range, which is set by the occupant through the shift range setting device (a mechanical shift lever), reliably coincides with the actual shift range of the shift range change mechanism.

However, in the case of the electric shift range change apparatus, there is no mechanical connection between the shift range setting device and the shift range change mechanism, as described above. Thus, when the power supply of the SBW controller is instantaneously interrupted, and thereby the SBW controller is restarted, it may possibly happen that the SBW controller cannot correctly recognize the actual shift range.

SUMMARY OF THE INVENTION

The present invention addresses the above disadvantages. Thus, it is an objective of the present invention to provide an automatic transmission system that enables more reliable operation of an automatic transmission apparatus in a case of instantaneous power interruption. It is another objective of the present invention to provide a method for controlling an automatic transmission apparatus in a more reliable manner at time of occurrence of instantaneous power interruption.

According to one aspect, there is provided an automatic transmission system for a vehicle having an internal combustion engine. The automatic transmission system includes an automatic transmission apparatus, an AT controller, a shift range change mechanism, an electric actuator, a shift range setting device and an SBW controller. The automatic transmission apparatus changes a rotational speed of the engine and outputs the changed rotational speed of the engine toward wheels of the vehicle. The AT controller controls gear change in the automatic transmission apparatus. The shift range change mechanism changes an actual shift range of the automatic transmission apparatus. The electric actuator includes an electric motor and an output shaft. The output shaft is driven by the electric motor to drive the shift range change mechanism. A user selects a shift range of the automatic transmission apparatus through the shift range setting device. The shift range setting device outputs a range demand value that indicates the currently selected shift range. The SBW controller controls the electric motor based on the range demand value outputted from the shift range setting device and a rotational angular position of the output shaft to drive the shift range change mechanism and thereby to change the actual shift range to the currently selected shift range. The SBW controller includes an SBW storage device. The SBW controller stores the rotational angular position of the output shaft into the SBW storage device. When the SBW controller is restarted due to instantaneous power interruption, the SBW controller maintains and uses the current angular position of the output shaft, which is stored in the SBW storage device, as a latest rotational angular position of the output shaft that is used to drive the shift range change mechanism upon satisfaction of the following conditions: the electric motor has not been driven before the instantaneous power interruption; and the current rotational angular position of the output shaft, which is stored in the SBW storage device, is not destroyed.

In another aspect, the above SBW controller may be modified as follows. That is, when the SBW controller is restarted due to instantaneous power interruption, and the electric motor has not been driven before the instantaneous power interruption, the SBW controller may obtain a rotational angular position of the output shaft based on the current range demand value and uses the obtained rotational angular position of the output shaft as a latest rotational angular position of the output shaft that is used to drive the shift range change mechanism.

In another aspect, the above AT controller may include an AT storage device. The AT controller may store a rotational angular position of the output shaft, which is recognized by the AT controller, into the AT storage device. Also, in this aspect, the SBW controller may be modified as follows. That is, when the SBW controller is restarted due to instantaneous power interruption, the SBW controller may obtain the recognized rotational angular position of the output shaft retrieved from the AT storage device of the AT controller and may use the recognized rotational angular position of the output shaft as a latest rotational angular position of the output shaft that is used to drive the shift range change mechanism.

In another aspect, the SBW controller may be also modified as follows. That is, when the SBW controller is restarted due to instantaneous power interruption, and the electric motor has been driven before the instantaneous power interruption, the SBW controlle may notify the AT controller that the SBW controller alone is not able to determine a latest rotational angular position of the output shaft that is used to drive the shift range change mechanism.

In another aspect, when the AT controller senses instantaneous power interruption of the SBW controller, the AT controller may determine a latest rotational angular position of the output shaft based on information present in the AT controller.

In another aspect, there is provided a method for controlling an automatic transmission apparatus. According to the method, a rotational angular position of an output shaft of an electric actuator, which is driven by an electric motor of the electric actuator to drive a shift range change mechanism, is stored into an SBW storage device of an SBW controller that controls the electric motor. Then, it is determined, through the SBW controller, whether the electric motor has been driven before instantaneous power interruption of the SBW controller after restarting of the SBW controller caused by the instantaneous power interruption. Thereafter, it is determined, through the SBW controller, whether the current rotational angular position of the output shaft, which is stored in the SBW storage device, is destroyed after the restarting of the SBW controller. Then, the current rotational angular position of the output shaft, which is stored in the SBW storage device, is maintained as a latest rotational angular position of the output shaft after the restarting of the SBW controller upon satisfaction of the following conditions: it is determined, through the SBW controller, that the electric motor has not been driven before the instantaneous power interruption; and it is determined, through the SBW controller, that the current rotational angular position of the output shaft, which is stored in the SBW storage device, is not destroyed. Then, the electric motor of the electric actuator is controlled from the SBW controller based on a range demand value outputted from a shift range setting device and the latest rotational angular position of the output shaft to drive the shift range change mechanism and thereby to change an actual shift range of an automatic transmission apparatus to a selected shift range, which is selected by a user and is indicated by the range demand value.

In another aspect, there is provided a method for controlling an automatic transmission apparatus. According to the method, it is determined, through an SBW controller that controls an electric motor of an electric actuator, whether the electric motor, which drives an output shaft of the electric actuator to drive a shift range change mechanism and thereby to change an actual shift range of an automatic transmission apparatus, has been driven before instantaneous power interruption of the SBW controller. Then, a rotational angular position of the output shaft of the electric actuator is obtained through the SBW controller after restarting of the SBW controller caused by the instantaneous power interruption when it is determined, through the SBW controller, that the electric motor has not been driven before the instantaneous power interruption. The obtaining of the rotational angular position of the output shaft is based on a current range demand value, which is outputted from a shift range setting device and indicates a selected shift range, which is selected by a user. Then, the electric motor is controlled from the SBW controller based on the range demand value outputted from the shift range setting device and the obtained rotational angular position of the output shaft to drive the shift range change mechanism and thereby to change the actual shift range of the automatic transmission apparatus to the selected shift range, which is selected by the user and is indicated by the range demand value.

In another aspect, there is also provided a method for controlling an automatic transmission apparatus. According to the method, a rotational angular position of an output shaft of an electric actuator, which is driven by an electric motor of the electric actuator to drive a shift range change mechanism, is stored into an AT storage device of an AT controller that controls gear change in an automatic transmission apparatus. Then, the rotational angular position of the output shaft is obtained from the AT storage device, and the obtained rotational angular position of the output shaft is provided to an SBW controller, which controls the electric motor, when the SBW controller is restarted due to instantaneous power interruption. Then, the electric motor is controlled from the SBW controller based on a range demand value outputted from a shift range setting device and the obtained rotational angular position of the output shaft to drive the shift range change mechanism and thereby to change an actual shift range of the automatic transmission apparatus to a selected shift range, which is selected by a user and is indicated by the range demand value.

In another aspect, there is provided a method for controlling an automatic transmission apparatus. According to the method, it is determined, through an SBW controller that controls an electric motor of an electric actuator, whether the electric motor, which drives an output shaft of the electric actuator to drive a shift range change mechanism and thereby to change an actual shift range of an automatic transmission apparatus, has been driven before instantaneous power interruption of an SBW controller that controls the electric motor. Then, it is notified from the SBW controller to an AT controller, which controls gear change in an automatic transmission apparatus, that the SBW controller alone is not able to determine a latest rotational angular position of the output shaft of the electric actuator upon restarting of the SBW controller caused by the instantaneous power interruption when it is determined, through the SBW controller, that the electric motor has been driven before the instantaneous power interruption of the SBW controller.

In another aspect, there is also provided a method for controlling an automatic transmission apparatus. According to the method, it is determined, through an AT controller that controls gear change in the automatic transmission apparatus, whether instantaneous power interruption of an SBW controller, which controls an electric motor of an electric actuator to drive a shift range change mechanism through an output shaft of the electric actuator and thereby to change an actual shift range of an automatic transmission apparatus, has occurred. Then, it is determined, through the AT controller, a latest rotational angular position of the output shaft based on information present in the AT controller when it is determined, through the AT controller, that the instantaneous power interruption of the SBW controller has occurred.

BRIEF DESCRIPTION OF THE DRAWINGS

The invention, together with additional objectives, features and advantages thereof, will be best understood from the following description, the appended claims and the accompanying drawings in which:

FIG. 1 is a schematic view showing a structure of a shift range change apparatus of an automatic transmission system according to a first embodiment of the present invention;

FIG. 3 is a perspective view of a shift range change mechanism, which includes a parking change mechanism, according to the first embodiment;

DETAILED DESCRIPTION OF THE INVENTION

First Embodiment

Figure 2:
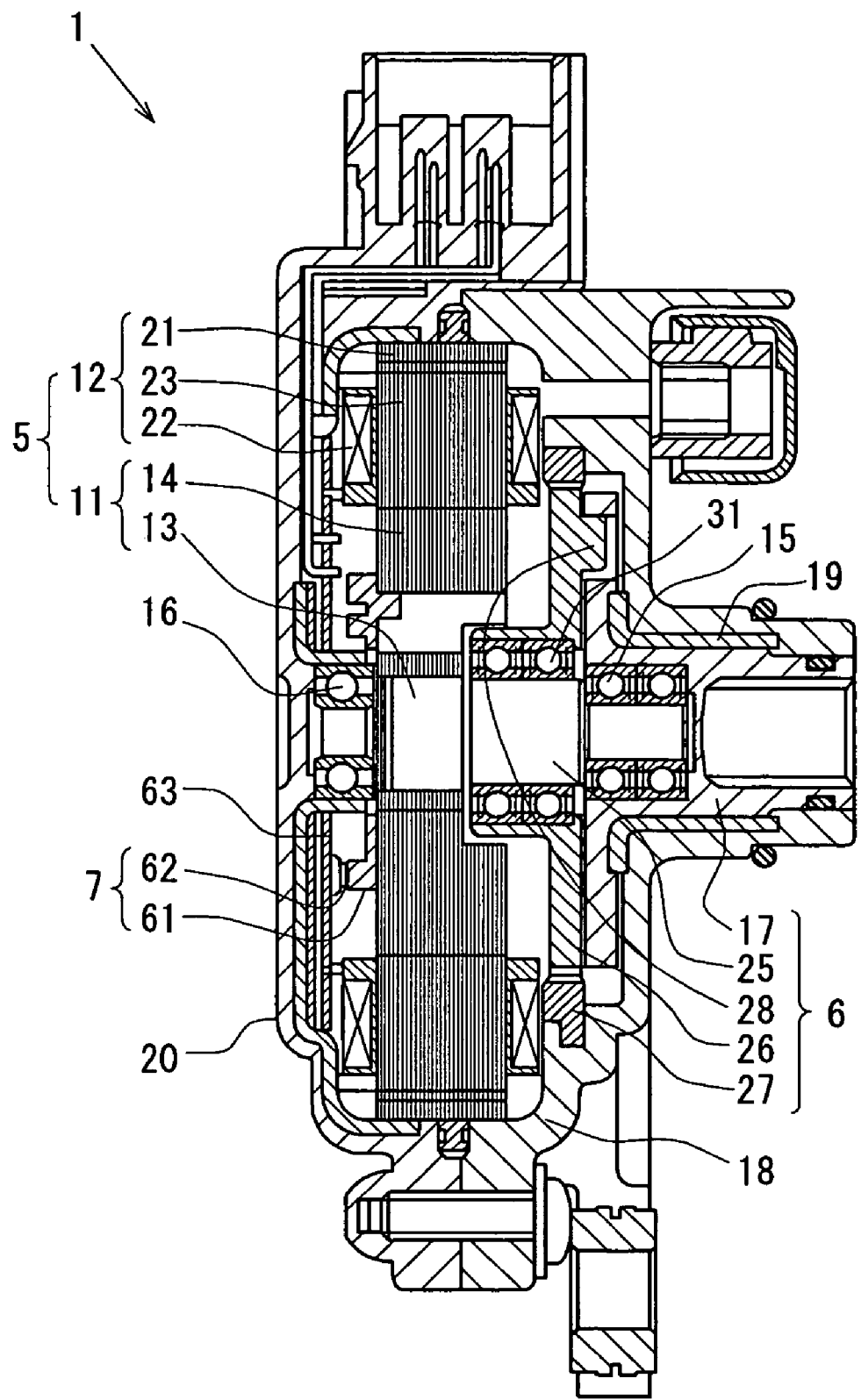
FIG. 2 is a cross sectional view of an electric actuator according to the first embodiment.

In the following description, a main structural feature of a first embodiment of the present invention will be first described with reference to FIGS. 1 to 3, and then a characteristic operation of the first embodiment will be described with reference to FIGS. 4 to 11.

A shift range change apparatus is an apparatus that changes an operational position of a shift range change mechanism 3 (including a parking change mechanism 4 shown in FIG. 3), which is installed in a vehicle automatic transmission apparatus 2 (FIG. 1), through operation of an electric actuator 1.

The electric actuator 1 is a servo mechanism, which drives the shift range change mechanism 3. Specifically, the electric actuator 1 includes a synchronous electric motor 5, a speed reducer 6 and an encoder 7. The speed reducer 6 reduces a rotational speed of the electric motor 5 and drives the shift range change mechanism 3. The encoder 7 senses a rotational angle of the electric motor 5 and an output shaft position of the speed reducer 6 (a rotational angle of an output shaft 17, which is an angle that corresponds to an actual shift range).

An SBW controller 9 controls the rotation of the electric motor 5, which drives the shift range change mechanism 3 through the speed reducer 6.

In the shift range change apparatus, the SBW controller 9 controls a rotational direction, a rotational speed, a rotational angular amount and a rotational angle of the electric motor 5 to control an operational position in the shift range change mechanism 3 and an operational position in the parking change mechanism 4, which are driven through the speed reducer 6, and thereby to change the actual shift range and a parking operation (locking and unlocking of the output shaft of the automatic transmission apparatus 2) in the automatic transmission apparatus 2.

In the following description of the first embodiment, it is assumed that the right side of FIG. 2 is a front side, and the left side of FIG. 2 is a rear side.

Next, the electric motor 5 of the first embodiment will be described in detail.

The electric motor 5 of the first embodiment is a brushless switched reluctance (SR) motor, which does not use a permanent magnet and includes a rotor 11 and a stator 12. The rotor 11 is rotatably supported, and the stator 12 is coaxial with respect to the rotor 11.

The rotor 11 includes a rotor shaft 13 and a rotor core 14. The rotor shaft 13 is rotatably supported by two bearings, i.e., a front rolling bearing 15 and a rear rolling bearing 16, which are arranged at a front end and a rear end, respectively, of the rotor shaft 13.

The front rolling bearing 15 is securely fitted to an inner peripheral surface of the output shaft 17 of the speed reducer 6. The output shaft 17 of the speed reducer 6 is in turn rotatably supported by a metal bearing 19, which is fixed to an inner peripheral surface of a front housing part 18. In other words, the front end of the rotor shaft 13 is rotatably supported by the metal bearing 19 thorough the front rolling bearing 15 and the output shaft 17 at the front housing part 18.

The rear rolling bearing 16 is securely press fitted to an outer peripheral surface of the rear end of the rotor shaft 13 and is supported by a rear housing part 20.

The stator 12 includes a fixed stator core 21 and multiphase exciting coils 22, which generate a magnetic force upon energization of the exciting coils 22.

The stator core 21 is a multi-layer core, which is fixed to the rear housing part 20 and includes a plurality of laminar magnetic plates that are stacked one after another. The stator core 21 includes a plurality of stator teeth (inward salient poles) 23, which are arranged at 30 degree intervals and radially inwardly project toward the rotor core 14. The exciting coils 22 are wound around the corresponding stator teeth 23.

The rotor core 14 is a multi-layer core, which is securely press fitted to the rotor shaft 13 and includes a plurality of laminar magnetic plates that are stacked one after another. The rotor core 14 includes a plurality of rotor teeth (outward salient poles), which are arranged at 45 degree intervals and radially outwardly project toward the stator core 21 located radially outward of the rotor core 14.

By sequentially changing an energizing position and an energizing direction of the exciting coils 22 of the respective phases, the active stator teeth 23, which magnetically attract the rotor teeth, are changed sequentially. Thus, the rotor 11 is rotated in one direction or the other direction.

Next, the speed reducer 6 of the first embodiment will be described in detail.

The speed reducer 6 of the first embodiment is a sun-and-planet gear type speed reducer (a cycloid speed reducer) and includes a sun gear (an inner gear having external teeth) 26, a ring gear (an outer gear having internal teeth) 27 and a transmitting device (a transmitting means) 28. The sun gear 26 is eccentrically rotatably installed to the rotor shaft 13 through an eccentric part 25, which is provided to the rotor shaft 13. The ring gear 27 is meshed with the sun gar 26, which is located radially inward of the ring gear 27. The transmitting device 28 transmits only a rotational force component of the sun gear 26 to the output shaft 17.

The eccentric portion 25 is a shaft, which is eccentrically rotated about a rotational center of the rotor shaft 13 to cause swing rotation of the sun gear 26. The eccentric portion 25 rotatably supports the sun gear 26 through a sun gear bearing 31, which is positioned radially outward of the eccentric portion 25.

As described above, the sun gear 26 is rotatably supported by the eccentric portion 25 of the rotor shaft 13 through the sun gear bearing 31. When the eccentric portion 25 is rotated, the sun gear 26 is rotated while being urged against the ring gear 27.

The ring gear 27 is fixed to the front housing part 18. Furthermore, the above speed reducing mechanism reduces the rotation of the rotor 11 at a ratio of, for example, 60:1.

Next, the shift range change mechanism 3 and the parking change mechanism 4 will be described with reference to FIG. 3.

The shift range change mechanism 3 is driven by the output shaft 17 of the speed reducer 6 to change the actual shift range of the automatic transmission apparatus 2.

The change of each shift range (e.g., a P range, an R range, an N range and a D range) of the automatic transmission apparatus 2 is implemented by sliding a manual spool valve 42, which is provided to a hydraulic pressure controller 41, to a corresponding position. In this way, a hydraulic pressure supply passage, which supplies a hydraulic pressure to a hydraulic clutch (not shown) of the automatic transmission apparatus 2, is changed to control an engaged state of the hydraulic clutch.

The parking change mechanism 4 is synchronized with the shift range change mechanism 3. When the actual shift range is set to the parking (P) range, the output shaft of the automatic transmission apparatus 2 is mechanically locked by the parking change mechanism 4. Shifting between the locking and the unlocking of the output shaft of the automatic transmission apparatus 2 through the parking change mechanism 4 is implemented by engaging and disengaging a recess 43a of a park gear 43 relative to a protrusion 44a of a park pole 44. The park gear 43 is connected to the output shaft of the automatic transmission apparatus 2 through a drive shaft (not shown) and/or a differential gear (not shown). When rotation of the park gear 43 is limited by the park change mechanism 4, the output shaft side of the automatic transmission apparatus 2 (a drive wheel side of the vehicle) is locked to achieve the parking lock state of the vehicle.

A generally fan shaped detent plate 46 is fixed by, for example, a spring pin (not shown) to a control rod 45, which is driven by the speed reducer 6.

A plurality of recesses 46a is provided in a radially outer end (a generally fan shaped outer arcuate portion) of the detent plate 46. When an engaging portion 47a at a distal end of a detent spring 47, which is fixed to the hydraulic pressure controller 41, is engaged with the corresponding recess 46a, the current shift range is maintained.

A pin 48, which drives the manual spool valve 42, is fixed to the detent plate 46.

The pin 48 is engaged with an annular groove 49, which is formed in an end of the manual spool valve 42. When the detent plate 46 is rotated by the control rod 45, the pin 48 is driven along an arcuate path. Thus, the manual spool valve 42, which is engaged with the pin 48, is moved linearly in an interior of the hydraulic pressure controller 41.

In a view taken in a direction of an arrow A in FIG. 3, when the control rod 45 is rotated in a clockwise direction, the pin 48 is driven in the clockwise direction through the detent plate 46. Thus, the pin 48 pushes the manual spool valve 42 toward the interior of the hydraulic pressure controller 41 to sequentially change an active hydraulic fluid passage in the hydraulic pressure controller 41 in an order of a hydraulic fluid passage of the D range, a hydraulic fluid passage of the N range, a hydraulic fluid passage of the R range and a hydraulic fluid passage of the P range. Thus, the shift range of the automatic transmission apparatus 2 is changed in the order of the D range, the N range, the R range and the P range.

In the view taken in the direction of the arrow A in FIG. 3, when the control rod 45 is rotated in a counterclockwise direction, the pin 48 is driven to pull the manual spool valve 42 in a direction away from the hydraulic pressure controller 41. Thus, the active hydraulic fluid passage of the hydraulic pressure controller 41 is changed in the order of the hydraulic fluid passage of the P range, the hydraulic fluid passage of the R range, the hydraulic fluid passage of the N range and the hydraulic fluid passage of the D range. Thus, the shift range of the automatic transmission apparatus 2 is changed in the order of the P range, the R range, the N range and the D range.

A park rod 51 is fixed to the detent plate 46 to drive the park pole 44. A conical portion 52 is provided in a distal end of the park rod 51.

The conical portion 52 is interposed between a protruded portion 53 of a housing of the automatic transmission apparatus 2 and the park pole 44. In the view taken in the direction of the arrow A in FIG. 3, when the control rod 45 is rotated in the clockwise direction (specifically, from the R range to the P range), the park rod 51 is driven through the detent plate 46 in a direction of an arrow B in FIG. 3 to push up the park pole 44. Thus, the park pole 44 is rotated about a shaft 44b in a direction of an arrow C in FIG. 3. Therefore, the protrusion 44a of the park pole 44 is engaged with the opposed recess 43a of the park gear 43 to achieve the locked state of the parking change mechanism 4.

When the control rod 45 is rotated in the opposite direction (specifically, from the P range to the R range), the park rod 51 is pulled back in an opposite direction, which is opposite from the direction of the arrow B in FIG. 3. Thus, the urging force, which pushes up the park pole 44, is removed. The park pole 44 is always urged by a spring (not shown) in an opposite direction, which is opposite from the direction of the arrow C in FIG. 3. Thus, the protrusion 44a of the park pole 44 is pushed away from the opposed recess 43a of the park gear 43 to release the park gear 43 into a free state, and thereby the parking change mechanism 4 is placed into the unlocked state.

Next, the encoder 7 will be described in detail.

The electric actuator 1 includes the encoder 7, which senses the rotational angle of the rotor 11 and is received in the housing (the front housing part 18 and the rear housing part 20) of the electric actuator 1. The rotational angle of the rotor 11 is sensed with the encoder 7, and the energization of the exciting coils 22 is changed based on the sensed rotational angle of the rotor 11. Thus, the electric motor 5 can be rotated at a high speed without losing the synchronism of the electric motor 5.

The encoder 7 of the first embodiment is of an incremental type and includes a magnet 61 and Hall ICs 62. The magnet 61 is fixed to the rotor 11 to rotate integrally with the rotor 11. The Hall ICs 62 are arranged in the rear housing part 20 to sense the magnetism generated from the magnet 61. More specifically, the Hall ICs 62 are supported on a circuit board 63, which is received in the rear housing part 20.

The magnet 61 has a generally ring plate form and is arranged coaxially with respect to the rotor shaft 13. The magnet 61 is joined to an axial end surface (a rear end surface in FIG. 2) of the rotor core 14. The end surface (the rear end surface in FIG. 2) of the magnet 61, which is opposed to the Hall ICs 62, is magnetized to generate a magnetic force in the axial direction of the magnet 61 to enable the sensing of the rotational angle and the rotational direction of the rotor core 14 and thereby of the output shaft 17.

With the above arrangement, when the rotor 11 is rotated, the magnetized part of the magnet 61 is rotated. Thus, a magnetic flux density, which is sensed by the Hall ICs 62 opposed to the magnet 61, is changed, and thereby the Hall ICs 62 generate an output waveform, which corresponds to the rotation of the rotor 11.

Desirably, the encoder 7 includes, for example, two sensing parts, which sense the signals from, for example, two Hall ICs 62 and perform waveform shaping of the sensed signals. Then, based on the output pulse edges of the signals, which have undergone the waveform shaping, the rotational direction of the rotor 11 is determined. In this way, it is possible to determine whether the motor 5 (specifically the rotor 11) is rotated in the normal direction or the reverse direction.

Next, the SBW controller 9 will be described with reference to FIG. 1.

The SBW controller (SBW-ECU) 9, which controls the energization (the power supply) of the electric motor 5, is a microcomputer of a known structure that includes a CPU, an SBW storage device (e.g., a memory such as a ROM, an EEPROM, an SRAM, a RAM) 9a, an input circuit, an output circuit and a power supply circuit. The CPU performs various control operations and computing operations. The SBW storage device 9a stores various programs and data.

An automatic transmission system of the present embodiment includes the automatic transmission apparatus 2, the hydraulic pressure controller 41 and an AT controller (an AT-ECU) 10. The automatic transmission apparatus 2 includes a speed change gear device, a torque converter and a lock-up device of the torque converter, which form a mechanical mechanism. The speed change gear device includes the sun-and-planet gear mechanisms. The lock-up device provides a lock-up function to the torque converter. The hydraulic pressure controller 41 changes a hydraulic pressure of a hydraulic clutch and a hydraulic pressure of a hydraulic brake in the automatic transmission apparatus 2. The AT controller 10 changes a gear change state by changing an engaging state of the hydraulic clutch and an engaging state of the hydraulic brake in the automatic transmission apparatus 2 through controlling of the hydraulic pressure controller 41.

The AT controller 10 is connected to an operational parameter sensing means for sensing operational parameters, such as an engine operational state, a vehicle running state, an operator's operational command.

The operational parameter sensing means may include a start switch(s) 81, a shift range setting device (a shift range setting means) 82, a vehicle speed sensor 83, a turbine sensor 84 and/or other sensors, such as an engine rotational speed sensor and a brake switch. The start switch(s) 81 may include, for example, an ignition switch and/or an accessory switch of the vehicle. The shift range setting device 82 is operated by the operator (user), i.e., a vehicle occupant and may include, for example, a shift range setting switch, a shift lever position sensor and/or a joystick. The vehicle speed sensor 83 senses an output rotational speed (rpm) of the automatic transmission apparatus 2. The turbine sensor 84 senses a turbine rotational speed (rpm) of the torque converter of the automatic transmission apparatus 2.

In FIG. 1, numeral 85 indicates a vehicle battery, and numeral 86 indicates a display/warning device (a display/warning means). The display/warning device 86 indicates, for example, an operational state (e.g., the actual shift range) of the automatic transmission apparatus 2. The display/warning device 86 may include, for example, a visual display device(s), such as an LCD, for providing a visual display, a warning lamp(s) and/or a voice warning device(s) for providing a voice warning.

Similar to the SBW controller 9, the AT controller 10 is a microcomputer of a known structure that includes a CPU, an AT storage device (e.g., a memory such as a ROM, an EEPROM, an SRAM, a RAM) 10a, an input circuit, an output circuit and a power supply circuit. The CPU performs various control operations and computing operations. The AT storage device 10a stores various programs and data. The AT controller 10 controls the gear change (the gear change state) of the automatic transmission apparatus 2 according to the operational parameters, which are sensed by the operational parameter sensors (a operational parameter sensing means).

The SBW controller 9 is provided with various control programs, such as a range change processing means for controlling the electric motor 5 in such a manner that a range demand value, which is outputted from the shift range setting device 82, coincides with the actual shift range, which is recognized by the SBW controller 9.

The range change processing means is a control program that implements a control function, which adjusts the actual shift range sensed with the encoder 7 to coincide with the range demand value supplied to the SBW controller 9. Specifically, when a difference exists between the range demand value and the actual shift range, the range change processing means determines the rotational direction, the rotational speed, the rotational angular amount and the rotational angle of the electric motor 5 based on the difference between the range demand value and the actual shift range. Then, the range change processing means controls the energization of the exciting coils 22 based on the thus determined results to control the rotational direction, the rotational speed, the rotational angular amount and/or the rotational angle of the electric motor 5. In this way, the range demand value, which is supplied to the SBW controller 9, coincides with the actual shift range, which is recognized by the SBW controller 9.

The SBW controller 9 is provided with various programs, such as a rotational position reading means for obtaining the rotational direction, the rotational speed, the rotational angular amount and the rotational angle of the rotor 11 and a rotational angle of the output shaft 17 (an angle that corresponds to the actual shift range) based on the output of the encoder 7 to control the electric motor 5.

At the time of changing the actual shift range, it is first obtained a target control amount (a target rotational direction, a target rotational speed, a target rotational angular amount, a target rotational angle) of the electric motor 5 that is required to change the current actual shift range, which is obtained through the rotational position reading means, to the target shift range. Then, the energization of the electric motor 5 is controlled in such a manner that the above target control amount of the electric motor 5 is actually obtained through the rotational position reading means.

The electric motor 5 is controlled based on a count value of a counter (not shown) that counts the number of the pulse edges of the pulse signals, which has undergone the pulse wave shaping and has been outputted from the encoder 7. The count value of the counter is cleared upon execution of a wall position sensing process described latter. For example, the P range may be set as the wall position. In a case where the range demand value is the D range, the count value, which corresponds from the P range to the D range, is already known. This count value is used as a target value (e.g., 500 counts) to drive the electric motor. For instance, when the actual count value of the encoder 7 gets close to the target value, the rotational speed of the electric motor may be decreased to more precisely control the rotational position of the electric motor.

The SBW controller 9 is the electronic control unit, which requires electric power supply. There exists a possibility that the electric power supply of the SBW controller 9 is instantaneously interrupted due to some unexpected reason (e.g., unexpected electrical contact malfunctioning) although the start switch 81 is being turned on.

When the electric power supply of the SBW controller 9 is instantaneously interrupted, the SBW controller 9 is restarted upon recovery of the electric power supply. At this time, it could happen that the SBW controller 9 does not have or cannot have the correct current actual shift range, i.e., the actual shift range after the recovery of the electric power supply. In view of the above point, it is needed that at least the SBW controller 9 has the correct information.

In the first embodiment, the following technique is used to alleviate the above disadvantage.

(1) The SBW controller 9 includes a first output shaft position storing means for storing the output shaft position S, which is recognized by the SBW controller 9, into the SBW storage device 9a (e.g., the SRAM).

The SBW controller 9 further includes a first restarting means. Now, it is assumed that the SBW controller 9 is restarted due to the instantaneous power interruption thereof. In such a case, when the electric motor 5 has not been operated before the instantaneous power interruption, and also the stored output shaft position S, which has been previously stored in the SBW storage device 9a before occurrence of the instantaneous power interruption, is not destroyed, the first restarting means sets the stored output shaft position S (the actual shift range), which is stored in the SBW storage device 9a, as the output shaft position (the latest rotational angular position of the output shaft) S after the restarting of the SBW controller 9.

(2) The SBW controller 9 includes a second restarting means. In the case where the SBW controller 9 is restarted due to the instantaneous power interruption thereof, when the electric motor 5 has not been operated before the instantaneous power interruption, the second restarting means obtains the output shaft position (the latest rotational angular position of the output shaft) S after the restarting of the SBW control apparatus 9 based on the range demand value outputted from the shift range setting device 82. In the case where the output shaft position S is set as one of the P range position, the R range position, the N range position and the D range position, the range demand value (indicating one of the P range, the R range, the N range and the D range) may be directly used as the output shaft position (the latest rotational angular position of the output shaft) S after the restarting of the SBW control apparatus 9. Alternatively, in a case where the output shaft position S is set as a rotational angular position of the output shaft in terms of degrees, the output shaft position (the latest rotational angular position of the output shaft) S may be computed based on the range demand value (indicating one of the P range, the R range, the N range and the D range).

(3) The SBW controller 9 includes an output shaft position supplying means. The output shaft position supplying means supplies the output shaft position S, which is recognized by the SBW controller 9, to the AT controller 10.

The AT controller 10 includes a second output shaft position storing means. The second output shaft position storing means stores the output shaft position S, which is supplied from the SBW controller 9, into the AT storage device 10a (e.g., the SRAM) as the output shaft position A, which is recognized by the AT controller 10.

The SBW controller 9 includes a third restarting means. In the case where the SBW controller 9 is restarted due to the instantaneous power interruption, the third restarting means sets the output shaft position A, which is stored in the AT storage device 10a, as the output shaft position (the latest rotational angular position of the output shaft) S after the restarting of the SBW controller 9.

(4) The SBW controller 9 includes a fourth restarting means. In the case where the SBW controller 9 is restarted due to the instantaneous power interruption, when the electric motor 5 has been driven before the instantaneous power interruption, the fourth restarting means notifies the AT controller 10 that the output shaft position S cannot be determined through the operation of the SBW controller 9 alone.

(5) The AT controller 10 includes a monitoring means, an instantaneous power interruption sensing means and a fifth restarting means. The monitoring means monitors a power supply state of the SBW controller 9. The instantaneous power interruption sensing means senses whether the power supply of the SBW controller 9 is instantaneously interrupted based on an output of the monitoring means. When the instantaneous power interruption of the SBW controller 9 is sensed by the instantaneous power interruption sensing means, the fifth restarting means specifies, i.e., determines the output shaft position A based on the information, which is stored in the AT controller 10.

(6) The AT controller 10 includes a sixth restarting means. In the case where the electric motor 5 has not been operated before the instantaneous power interruption of the SBW controller 9, when the instantaneous power interruption of the SBW controller 9 is sensed, the sixth restarting means sets the output shaft position A, which is stored in the AT storage device 10a, as the output shaft position (the latest rotational angular position of the output shaft) S after the restarting of the SBW controller 9.

(7) The AT controller 10 includes a seventh restarting means. In the case where the electric motor 5 has been operated before the instantaneous power interruption of the SBW controller 9, when the instantaneous power interruption of the SBW controller 9 is sensed, the seventh restarting means places the automatic transmission apparatus 2 into a neutral state and requests the SBW controller 9 to specify the output shaft position S through the wall position sensing process.

(8) The AT controller 10 includes a ninth restarting means. When the output shaft position S is determined after the sensing of the instantaneous power interruption of the SBW controller 9, the ninth restarting means determines that the SBW controller 9 has been recovered in a normal manner.

The above eighth restarting means will be described in a second embodiment.

The above exemplary control operations will be described with reference to flowcharts shown in FIGS. 4 to 10.

FIGS. 4 to 7 indicate the processing control operation executed in the SBW controller 9. This processing control operation of the SBW controller 9 will be described in an order of a start determination process, a main process, a state determination process for determining a state of the output shaft position S, and a restart process executed upon receiving a command from the AT controller 10.

Figure 8:
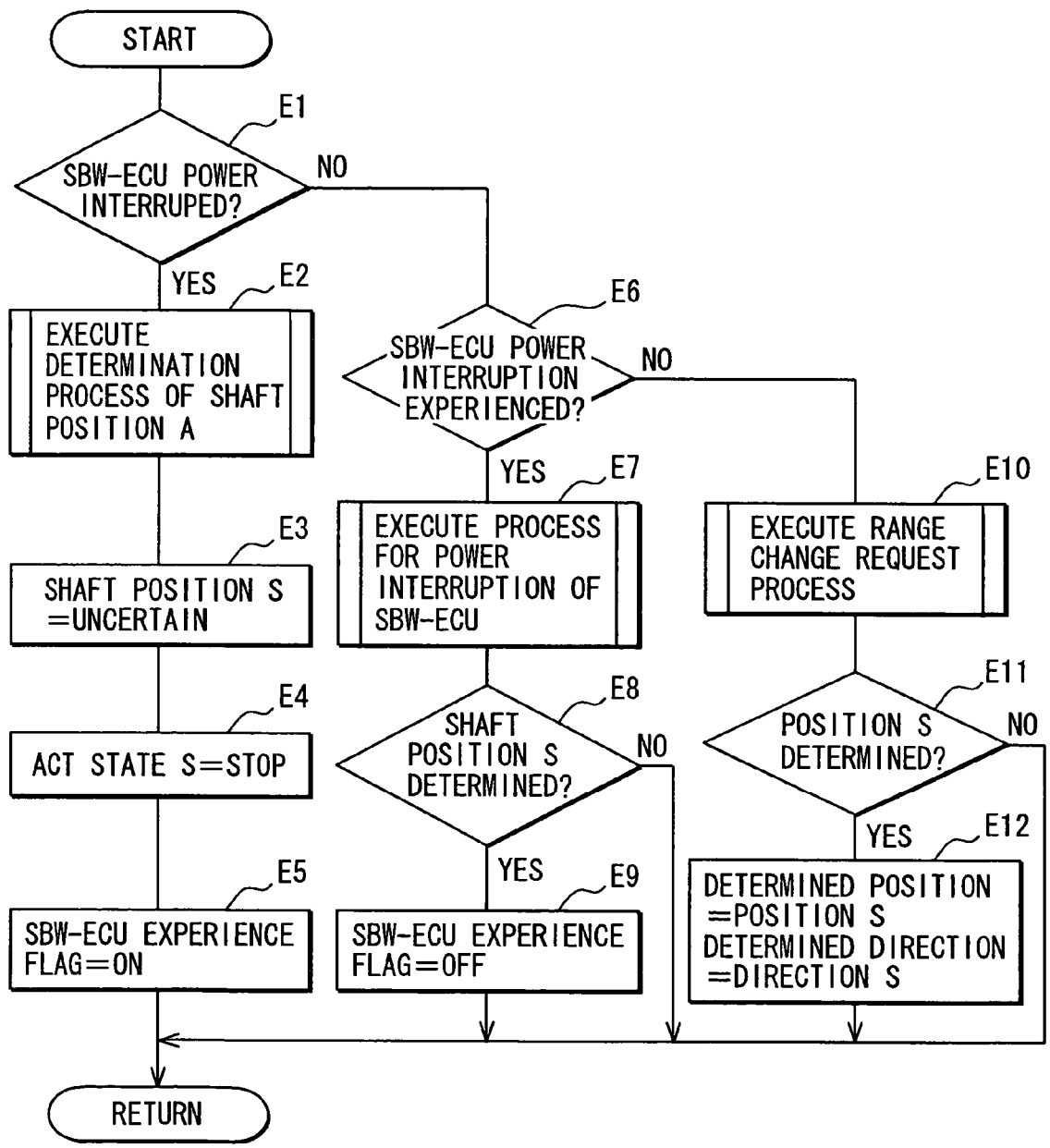
FIG. 8 is a flowchart showing an instantaneous power interruption determination process executed in the AT controller to determine instantaneous power interruption of the SBW controller according to the first embodiment.
Figure 9:
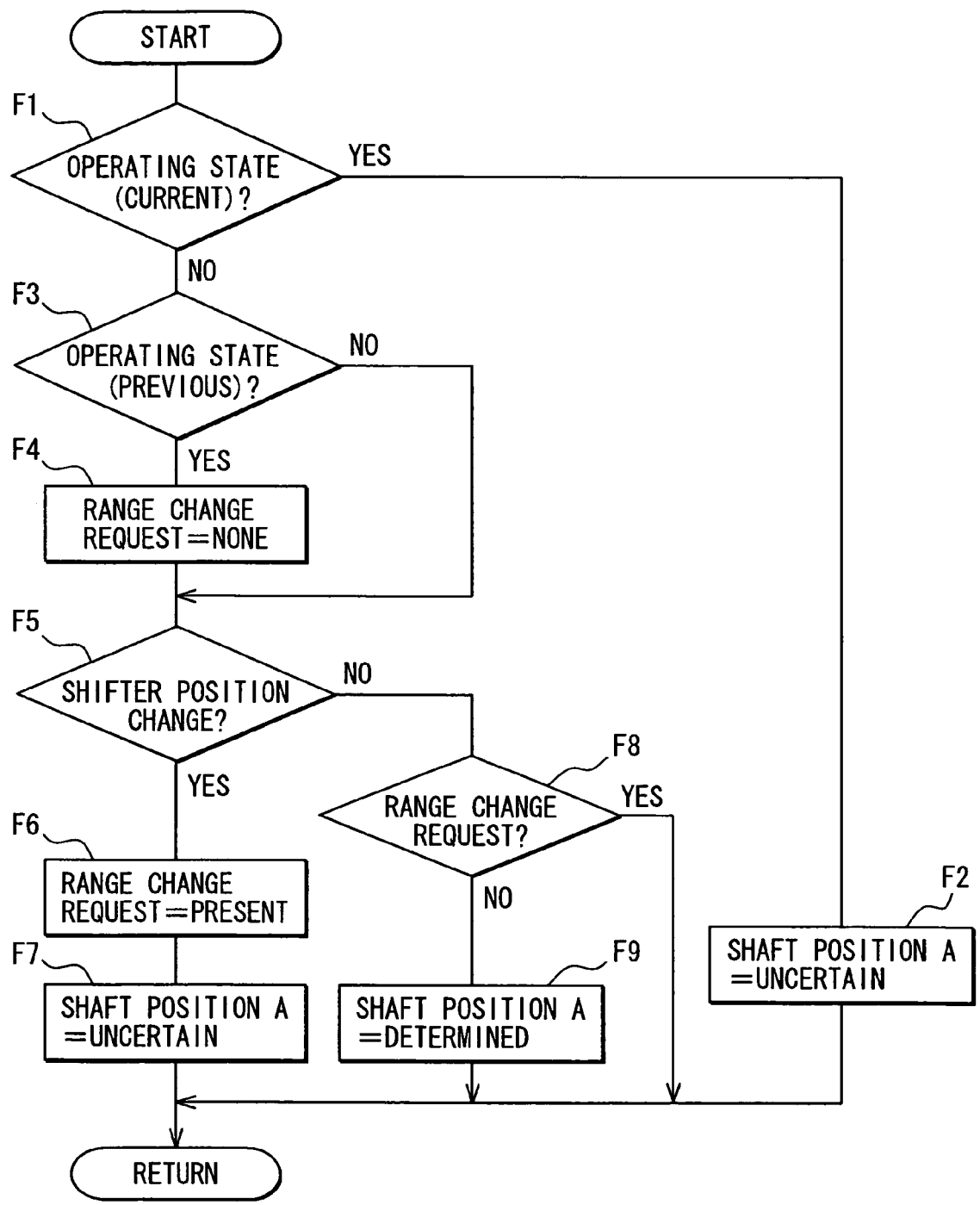
FIG. 9 is a flowchart showing a determination process for determining a state of an output shaft position in the AT controller according to the first embodiment.
Figure 10:
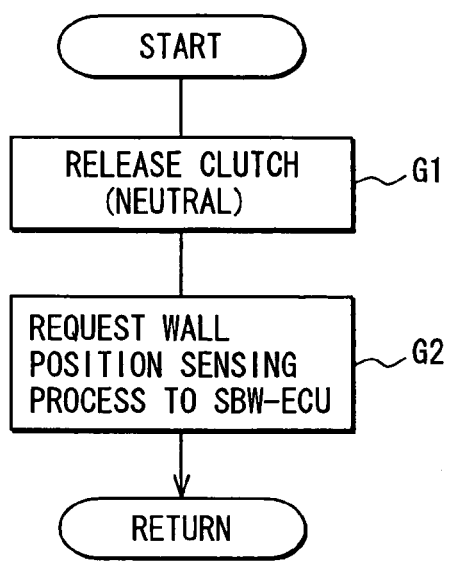
FIG. 10 is a flowchart showing a process executed in the AT controller at the time of instantaneous power interruption of the SBW controller according to the first embodiment.
Figure 11:
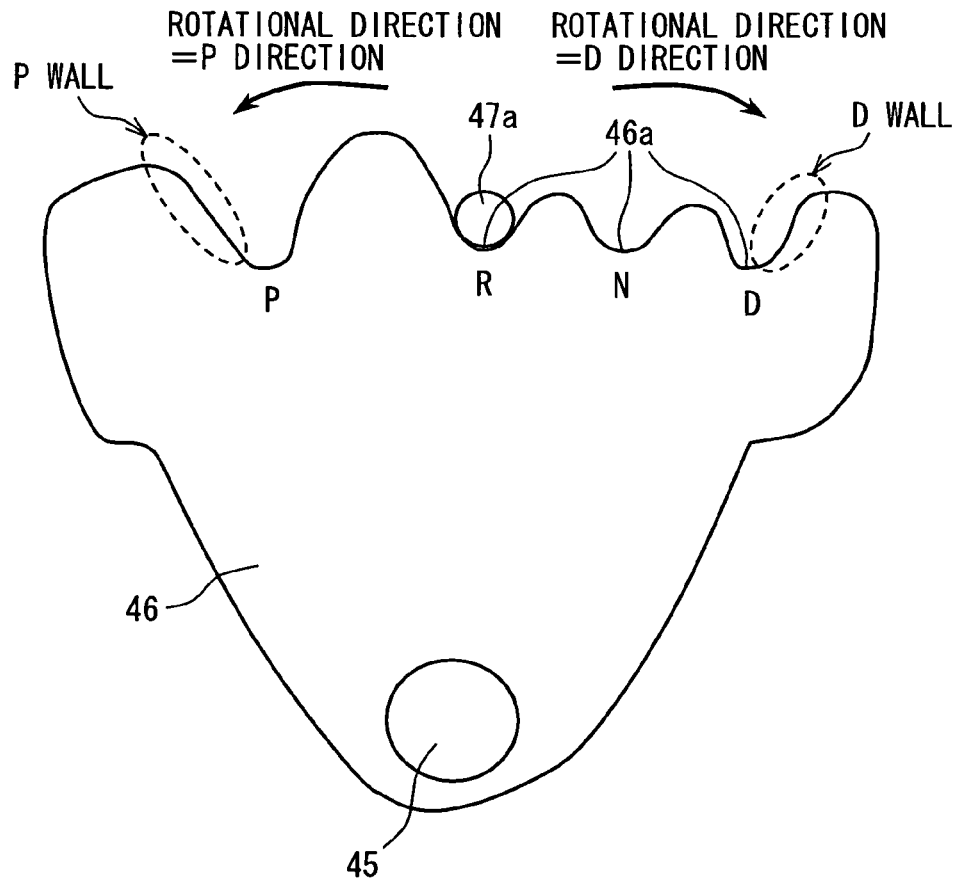
FIG. 11 is a schematic descriptive view showing a wall position sensing process according to the first embodiment.

Furthermore, FIGS. 8 to 10 indicate the processing control operation executed in the AT controller 10. This processing control operation of the AT controller 10 will be described in an order of an instantaneous power interruption determination process of the SBW controller 9, a determination process for determining the output shaft position A, and a process at the time of instantaneous power interruption of the SBW controller 9.

Figure 4:
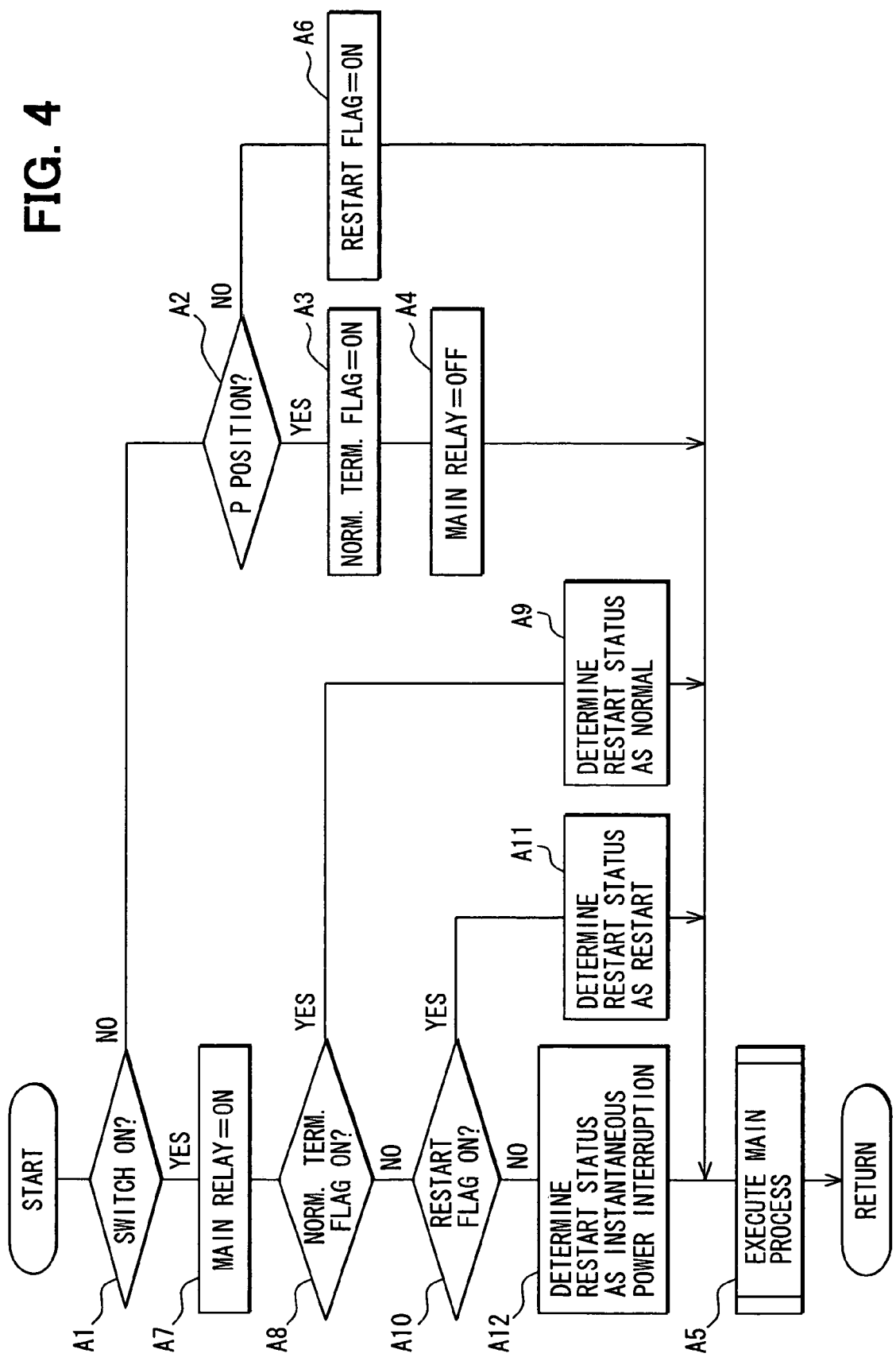
FIG. 4 is a flowchart showing a start determination process in an SBW controller according to the first embodiment.

Next, the start determination process in the SBW controller 9 will be described with reference to FIG. 4.

In this control routine, it is determined whether the current starting operation of the SBW controller 9 is caused by a normal turning on/off operation of the start switch (e.g., the ignition switch), or by some kind of error, such as erroneous turning off of the start switch by the user of the vehicle, or by the above described instantaneous power interruption.

First, when this routine starts, it is determined whether the start switch 81 is an ON state at step A1.

Figure 5:
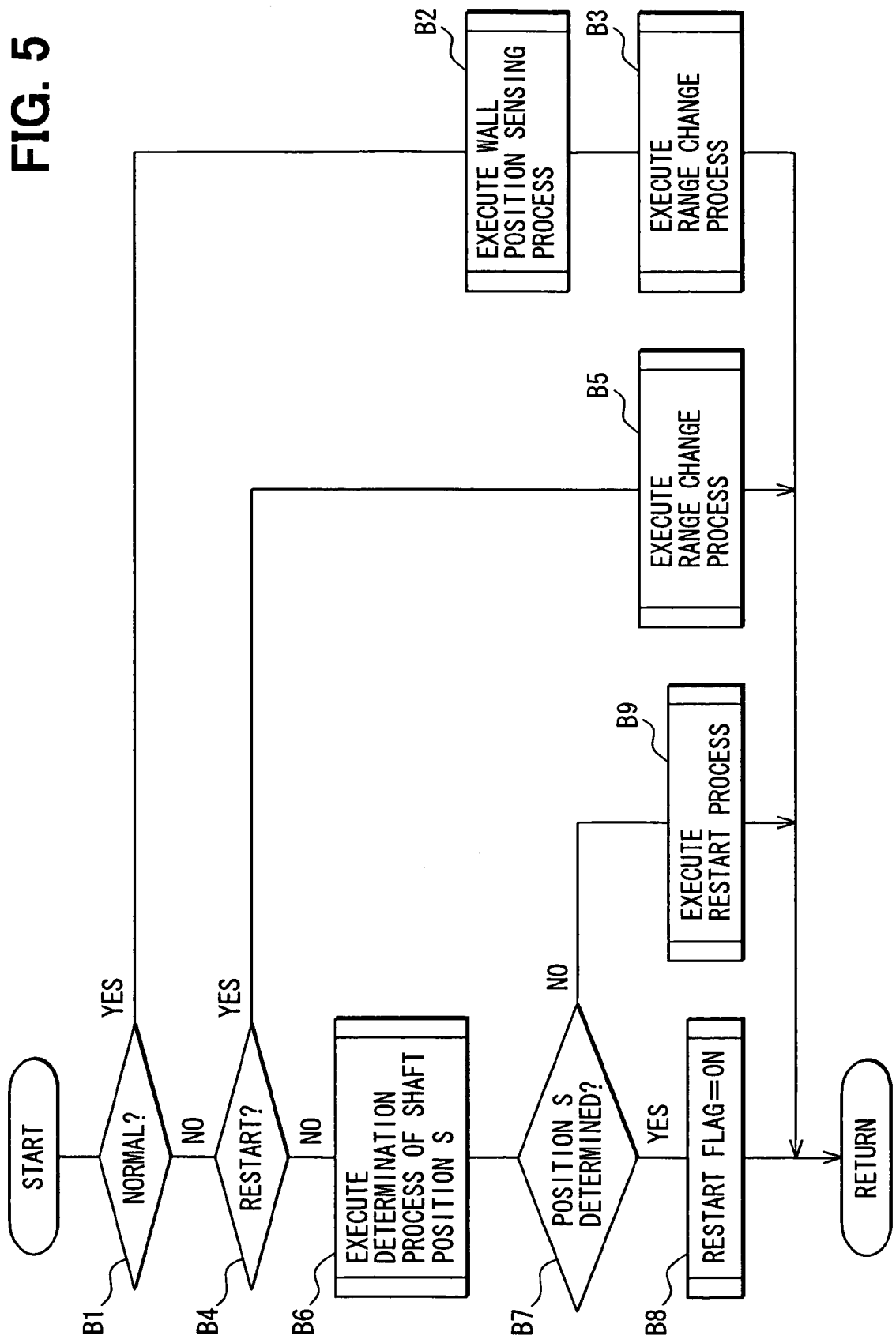
FIG. 5 is a flowchart showing a main process in the SBW controller according to the first embodiment.

When it is determined that the start switch 81 is in an OFF state at step A1 (i.e., NO at step A1), control proceeds to step A2. At step A2, it is determined whether the output shaft position S is the P range position. When it is determined that the output shaft position S is the P range position (i.e., YES at step A2), control proceeds to step A3. At step A3, a normal termination flag is placed in an ON state. Then, at step A4, a main relay, which is a power supply switch of the SBW controller 9, is placed in an OFF state. Thereafter, control proceeds to step A5 where a main process shown in FIG. 5 is executed. The main process shown in FIG. 5 will be described latter.

When it is determined that the output shaft position S is other than the P position, i.e., the output shaft position S is one of the R range position, the N range position and the D range position at step A2 (i.e., NO at step A2), control proceeds to step A6. At step A6, a restart flag is placed in an ON state. Then, control proceeds to step A5 where the main process is executed. In this case, the current operation is the erroneous off control operation of the start switch, so that unlike step A4, the main relay is not turned off.

When it is determined that the start switch 81 is ON at step A1 (i.e., YES at step A1), control proceeds to step A7 where the main relay is placed in an ON state. Then, at step A8, it is determined whether the normal termination flag is in the ON state. When it is determined that the normal termination flag is in the ON state at step A8 (i.e., YES at step A8), control proceeds to step A9. At step A9, it is determined that the current starting operation of the SBW controller 9 is due to the turning on of the start switch 81 after the normal termination of the previous operation, and thereby the start status is determined as normal. Then, control proceeds to step A5 where the main process is executed.

When it is determined that the normal termination flag is in an OFF state at step A8 (i.e., NO at step A8), control proceeds to step A10. At step A10, it is determined whether the restart flag is in an ON state. When it is determined that the restart flag is in the ON state at step A10 (i.e., YES at step A10), control proceeds to step A11. At step A11, it is determined that the current starting operation of the SBW controller 9 is due to the turning on of the start switch 81 after the turning off of the start switch 81 at the position other than the P range position, and thereby the start statues is determined as the restart. Then, control proceeds to step A5 where the main process is executed.

When it is determined that the restart flag is in the OFF state at step A10 (i.e., NO at step A10), control proceeds to step A12. At step A12, it is determined that the current starting operation of the SBW controller 9 is performed after instantaneous power interruption of the SBW controller 9 due to some reason, and thereby the start status is determined as the instantaneous power interruption. Then, control proceeds to step A5 where the main process is executed. Specifically, at steps A8, A10, it is determined that the current turning on control of the start switch is not normal one and is caused by the instantaneous power interruption, which results in YES at step A1. Thus, the main process is executed at step A5 based on the start status.

Next, the main process of the SBW controller 9 will be described with reference to FIG. 5.

When this routine shown in FIG. 5 starts, it is determined whether the start status is normal (see the normality determination process at step A9) at step B1. When it is determined that the start status is normal at step B1 (i.e., YES at step B1), control proceeds to step B2 where the wall position sensing process is executed to specify the output shaft position S.

The wall position sensing process is performed as follows. That is, with reference to FIG. 11, the detent plate 46 is rotated in the P direction or the D direction through the electric motor 5. When the amount of change in the count value (the count value of the encoder 7), which indicates the movable amount of the electric motor 5, is equal to or less than a predetermined value per unit time, it is determined that the rotation of the electric motor 5 is mechanically limited, i.e., it is determined that the engaging portion 47a of the detent spring 47 is engaged with a P wall or a D wall of the detent plate 46. The output shaft position S at the time of placing the engaging portion 47a of the detent spring 47 engaged with the P wall or the D wall is already known. Thus, the wall position sensing process is an initial position setting process for setting this known output shaft position as the output shaft position S. For example, the initial position setting process may be performed as follows. When it is sensed that the rotation of the electric motor 5 is mechanically limited due to the engagement of the engaging portion 47a of the detent spring 47 to the P wall of the detent plate 46 upon rotation of the detent plate in the P direction, the count value of the encoder 7 may be set to zero.

After executing the process of step B2, control proceeds to step B3. At step B3, a range change process is executed by the range change processing means, and the routine shown in FIG. 5 is terminated.

When it is determined that the start status is not normal at step B1 (i.e., NO at step B1), control proceeds to step B4. At step B4, it is determined whether the start status is the restart (see the restart determination process at step A11). When it is determined that the start status is the restart at step B4 (i.e., YES at step B4), control proceeds to step B5 where the range change process is executed by the range change processing means, and the current routine shown in FIG. 5 is terminated. When it is determined that the start status is the restart at step B4, it is assumed that the ignition switch is turned on after the turning off of the ignition switch due to some reason. Thus, the initial position setting through the wall position sensing process, which is executed in the case of the normal starting (i.e., the start status being normal), should be correct and thereby effective. As a result, there is no need to perform step B2, which is executed in the case where the start status is determined as normal.

When it is determined that the start status is not the restart at step B4 (i.e., NO at step B4), it is determined that the instantaneous power interruption has occurred. Therefore, control proceeds to step B6 where the state determination process shown in FIG. 6 for determining the state of the output shaft position S is executed to determine the output shaft position S at the time of occurrence of the instantaneous power interruption.

After the execution of step B6, control proceeds to step B7. At step B7, it is determined whether the output shaft position S is determined in the state determination process at step B6. When it is determined that the output shaft position S has been determined at step B7 (i.e., YES at step B7), control proceeds to step B8. At step B8, the restart flag is placed in the ON state, and then the current routine shown in FIG. 5 is terminated.

Figure 7:
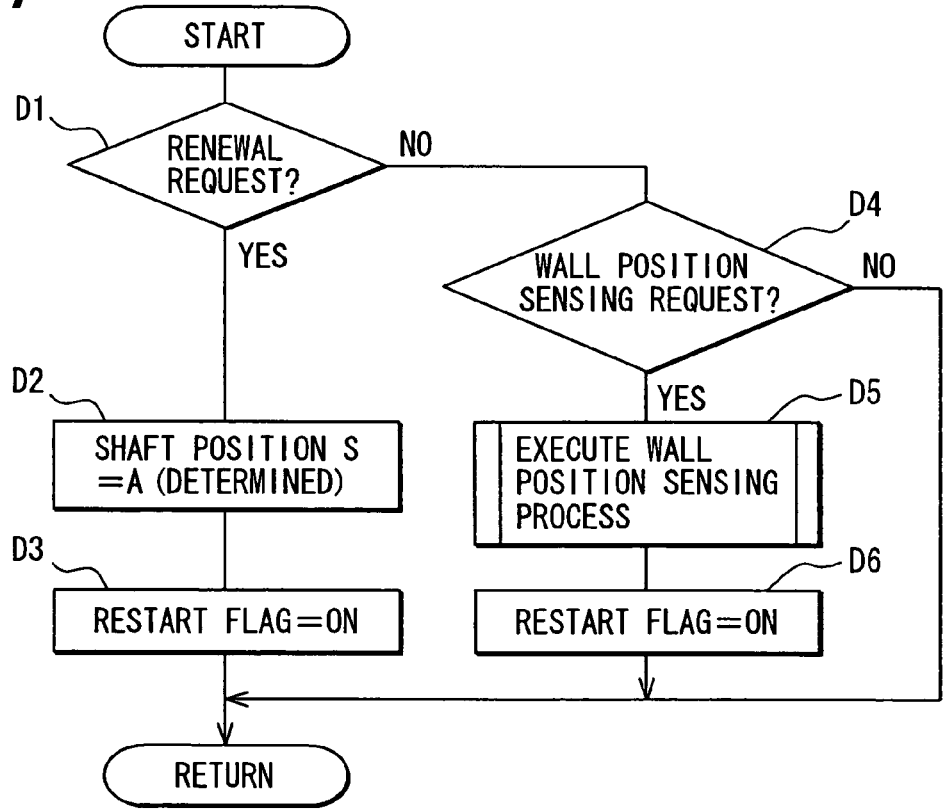
FIG. 7 is a flowchart showing a restart process executed in the SBW controller based on a command received from an AT controller according to the first embodiment.

When it is determined that the output shaft position S has not been determined at step B7 (i.e., NO at step B7), control proceeds to step B9. At step B9, the restart process of FIG. 7 is performed based on the corresponding command from the AT controller 10, and then the current routine shown in FIG. 5 is terminated.

Next, the state determination process for determining the state of the output shaft position S will be described with reference to FIG. 6.

Figure 6:
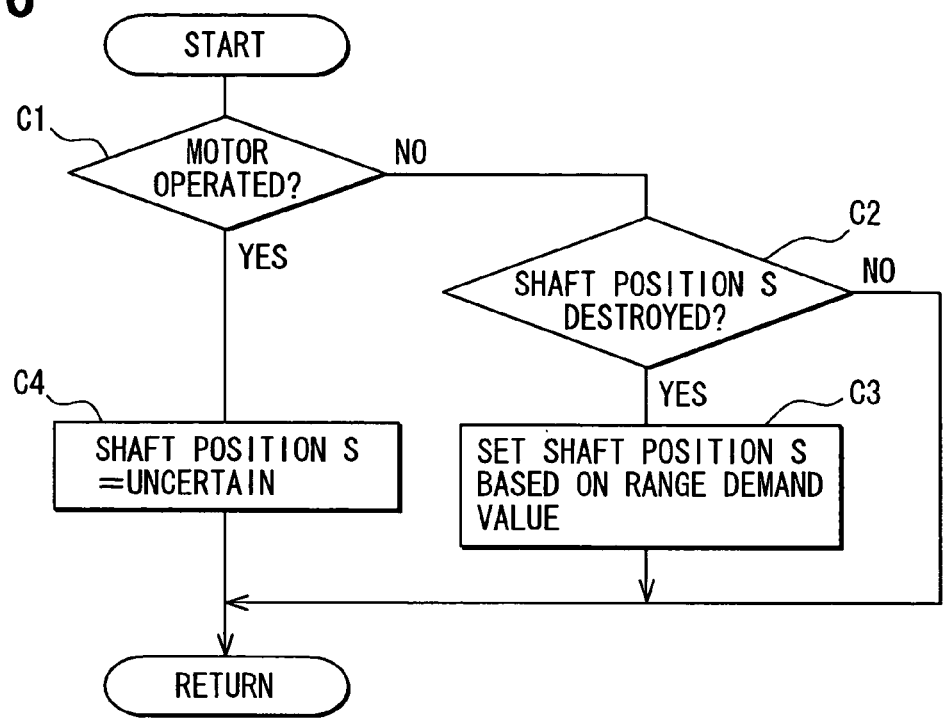
FIG. 6 is a flowchart showing a state determination process for determining a state of an output shaft position in the SBW controller according to the first embodiment.

When the instantaneous power interruption is sensed based on the result of the determination made at step B4, the routine of the state determination process shown in FIG. 6 starts. First, at step C1, it is determined whether the electric motor 5 has been operated before the instantaneous power interruption. When it is determined that the electric motor 5 has not been operated before the instantaneous power interruption at step C1 (i.e., NO at step C1), control proceeds to step C2. At step C2, it is determined whether the output shaft position S (data), which has been stored in the SBW storage device 9a before the instantaneous power interruption, is destroyed. For instance, this determination at step C2 may be made by comparing the output shaft position S stored in the SBW storage device 9a with mirror data of the output shaft position S, which is stored in a storage device other than the SBW storage device 9a. When the output shaft position stored in the SBW storage device 9a matches with the mirror data, it may be determined that the output shaft position stored in the SBW storage device 9a is not destroyed. In contrast, when the output shaft position stored in the SBW storage device 9a does not match with the mirror data, it may be determined that the output shaft position stored in the SBW storage device 9a is destroyed.

When it is determined that the output shaft position S (data) stored in the SBW storage device 9a is not destroyed at step C2 (NO at step C2), it is assumed that the electric motor 5 has been stopped before the instantaneous power interruption, and there is not RAM destruction. In such a case, the output shaft position S stored in the SBW storage device 9a is set as the output shaft position (the latest rotational angular position of the output shaft) S after the restarting of the SBW controller 9. This is the function of the first restarting means described above. Then, the current routine shown in FIG. 6 is terminated.

When it is determined that the output shaft position S (data) stored in the SBW storage device 9a is destroyed at step C2 (i.e., YES at step C2), it is assumed that the electric motor 5 has been stopped before the instantaneous power interruption, and there is the RAM destruction. In such a case, the output shaft position S after the restarting of the SBW controller 9 is set based on the range demand value outputted from the shift range setting device 82 at step C3. This is the function of the second restarting means described above. Then, the current routine shown in FIG. 6 is terminated.

When it is determined that the electric motor 5 has been operated before the instantaneous power interruption at step C1 (i.e., YES at step C1), control proceeds to step C4. At step C4, it is determined that the output shaft position S has not been determined (i.e., the output shaft position S being uncertain), and the current routine shown in FIG. 6 is terminated. In the case where the electric motor 5 has been operated before the instantaneous power interruption, it cannot be determined whether the engaging portion 47a of the detent spring 47 has passed the ridge(s) of the detent plate 46, so that the there is a high possibility that the range demand value outputted from the shift range setting device 82 does not coincide with the output shaft position S. Furthermore, at the time of the instantaneous power interruption, the counter could be reset. In such a case, the output shaft position S after the instantaneous power interruption may be incorrectly recognized as the initial position. Because of the above reasons, it is required to determine that the output shaft position S has not been determined at step C4.

Furthermore, it is possible to notify the AT controller 10 that the output shaft position S cannot be determined in the SBW controller 9 alone at step C4. This corresponds to the function of the fourth restarting means.

Next, the restart process based on the command of the AT controller 10 will be described with reference to FIG. 7.

The output shaft position S cannot be determined by the SBW controller 9 alone at step C4. Thus, in this process, the output shaft position S is determined with help from the AT controller 10.

When it is determined that the output shaft position S has not been determined at step C4, and thereby the routine shown in FIG. 7 is started, it is first determined whether a renewal request for requesting renewal of the output shaft position S (a request for changing the shift range) exists at step D1. When it is determined that the renewal request exists at step D1 (i.e., YES at step D1), control proceeds to step D2. At step D2, the output shaft position A, which is determined by the AT controller 10 and is thereby stored in the AT storage device 10a (see step F9 of FIG. 9), is set as the output shaft position (the latest rotational angular position of the output shaft) S after the restarting of the SBW controller 9. This corresponds to the third restarting means and the sixth restarting means.

Then, at step D3, the restart flag is placed in the ON state, and the current routine shown in FIG. 7 is terminated.

When it is determined that the renewal request does not exist at step D1 (i.e., NO at step D1), control proceeds to step D4. At step D4, it is determined whether a wall position sensing request from the AT controller 10 exists (see step G2 of FIG. 10). When it is determined that the wall position sensing request does not exist at step D4 (i.e., NO at step D4), the current routine shown in FIG. 7 is terminated. Step D4 is provided to enable the determining of the output shaft position S without use of the output shaft position A determined at the AT controller 10 upon receiving the wall position sensing request from the AT controller 10. More specifically, the SBW controller 9 executes the initial position setting process to obtain the initial position upon receiving the wall position sensing request, and then the SBW controller 9 determines the output shaft position S.

When it is determined that the wall position sensing request from the AT controller 10 exists at step D4 (i.e., YES at step D4), control proceeds to step D5. At step D5, the wall position sensing process (see the wall position sensing process at step B2) is executed.

Then, at step D6, the restart flag is placed in the ON state, and the current routine shown in FIG. 7 is terminated.

Next, the instantaneous power interruption determination process executed in the AT controller 10 for determining the instantaneous power interruption of the SBW controller 9 will be described with reference to FIG. 8.

When the routine shown in FIG. 8 starts, it is first determined whether the power supply of the SBW controller 9 has been instantaneously interrupted based an output of the monitoring means, which monitors the power supply state of the SBW controller 9, at step E1. This is the function of the instantaneous power interruption sensing means. When it is determined that the power supply of the SBW controller 9 has been instantaneously interrupted at step E1 (i.e., YES at step E1), that is, when it is determined that the SBW controller 9 is in a stop state or a state before restarting, control proceeds to step E2. At step E2, the determination process for determining the output shaft position A (the function of the fifth restarting means shown in FIG. 9) is executed. The determination of whether the instantaneous power interruption has occurred can be made in the following manner. That is, for instance, an instantaneous interruption determination flag may be provided in the SBW controller 9. When the turning off of the power supply is caused by turning off of the ignition switch, the flag may be set. If the turning off of the power supply is caused by the instantaneous power interruption, the instantaneous interruption flag is not set. Thus, it is possible to distinguish the instantaneous power interruption from the normal turning off operation of the ignition switch. This determination may be carried out in the AT controller 10 through a communication link that connects between the SBW controller 9 and the AT controller 10.

After the execution of step E2, control proceeds to step E3. At step E3, it is determined that the output shaft position S has not been determined (i.e., the output shaft position S being uncertain), and control proceeds to step E4. At step E4, it is determined that the electric motor 5 is stopped, i.e., the actuator state (ACT state) S is stop. Then, at step E5, an instantaneous interruption experience flag of the SBW controller 9 is placed in an ON state. Then, the current routine shown in FIG. 8 is terminated.

When it is determined that the power supply of the SBW controller 9 has not been instantaneously interrupted at step E1 (i.e., NO at step E1), that is when it is determined that the no instantaneous power interruption exists, and the SBW controller 9 is currently operated, control proceeds to step E6. At step E6, it is determined whether the instantaneous interruption experience flag in the SBW controller 9 is in the ON state to determine whether the current state of the SBW controller 9 is after recovery from the instantaneous power interruption or the unexperienced state where the SBW controller 9 has not experienced the instantaneous power interruption.

When it is determined that the instantaneous interruption experience flag is in the ON state at step E6 (i.e., YES at step E6), control proceeds to step E7. At step E7, the process (the function of the seventh restarting means) shown in FIG. 10 at the time of instantaneous power interruption of the SBW controller 9 is executed.

After the execution of the step E7, control proceeds to step E8. At step E8, it is determined whether the output shaft position S has been determined. When it is determined that the output shaft position S has not been determined at step E8 (i.e., NO at step E8), the current routine shown in FIG. 8 is terminated.

In contrast, when it is determined that the output shaft position S has been determined at step E8 (i.e., YES at step E8), control proceeds to step E9. At step E9, the instantaneous interruption experience flag of the SBW controller 9 is placed in the OFF state. Then, the current routine shown in FIG. 8 is terminated.

When it is determined that the instantaneous interruption experience flag is in the OFF state at step E6 (i.e., NO at step E6), it is assumed that the instantaneous power interruption has not occurred, and the operation is normal. Thus, in such a case, control proceeds to step E10. At step E10, a normal range change request process is executed. Then, at step E11, it is determined whether the output shaft position S has been determined. When it is determined that the output shaft position S has not been determined at step E8 (i.e., NO at step E8), the current routine shown in FIG. 8 is terminated.

When it is determined that the output shaft position S has been determined at step E11 (i.e., YES at step E11), control proceeds to step E12. At step E12, the output shaft position S is determined as a determined position, and the rotational direction S is determined as a determined direction. Then, the current routine shown in FIG. 8 is terminated. The rotational direction S is the rotational direction of the output shaft 17, which is determined by the SBW controller 9.

Next, the determination process of the output shaft position A, which is carried out in the AT controller 10, will be described.

When the instantaneous power interruption of the SBW controller 9 is sensed, and the routine shown in FIG. 9 is started, it is determined whether the electric motor 5 is currently in an operating state at step F1. When it is determined that the electric motor 5 is currently in the operating state at step F1 (i.e., YES at step F1), control proceeds to step F2. At step F2, it is determined that the output shaft position A has not been determined (i.e., the output shaft position A being uncertain), and the current routine shown in FIG. 9 is terminated.

When it is determined that the electric motor 5 has been stopped at step F1 (i.e., NO at step F1), control proceeds to step F3. At step F3, it is determined whether the electric motor 5 had been previously in the operating state. When it is determined that the electric motor 5 had been previously in the operating state at step F3 (i.e., YES at step F3), control proceeds to step F4. At step F4, the range change request is set to be none (i.e., non-existence of the range change request).

When it is determined that the electric motor 5 had been previously stopped at step F3 (i.e., NO at step F3), or after the execution of step F4, control proceeds to step F5. At step F5, it is determined whether a shifter position change (the shift change command from the shift range setting device 82) exists. When it is determined that the shifter position change exists at step F5 (i.e., YES at step F5), control proceeds to step F6. At step F6, the range change request is set to be present. Then, at step F7, it is determined that the output shaft position A has not been determined (i.e., the output shaft position A being uncertain), and then the current routine shown in FIG. 9 is terminated.

When it is determined that the shifter position change does not exist at step F5 (i.e., NO at step F5), control proceeds to step F8. At step F8, it is determined whether the range change request exists. When it is determined that the range change request exists at step F8 (i.e., YES at step F8), the current routine shown in FIG. 9 is terminated.

When it is determined that the range change request does not exist at step F8 (i.e., NO at step F8), control proceeds to step F9. At step F9, it is determined that the output shaft position A has been determined, and then the current routine shown in FIG. 9 is terminated.

Next, the process executed by the AT controller 10 at the time of instantaneous power interruption of the SBW controller 9 will be described with reference to FIG. 8.

When the SBW controller 9 is recovered from the instantaneous power interruption (the presence of the instantaneous power interruption experience), and the routing shown in FIG. 10 is started, the automatic transmission apparatus 2 is placed in a neutral state by releasing the hydraulic clutch and the hydraulic brake (step G1). Next, at step G2, the execution of the wall position sensing process is requested to the SBW controller 9 to specify the output shaft position S. Thereafter, the current routine shown in FIG. 10 is terminated.

In the state where the AT controller 10 senses the ON state of the restart flag in the SBW controller 9 (determining the output shaft position S) after the AT controller 10 senses the instantaneous power interruption of the SBW controller 9, the AT controller 10 determines that the SBW controller 9 has been recovered in the normal manner (a recovery process). This corresponds to the function of the seventh restarting process.

The first embodiment provides the following advantages.

The SBW controller 9 includes the first restarting means. In the case where the SBW controller 9 is restarted due to the instantaneous power interruption, when the electric motor 5 has not been operated before the instantaneous power interruption, and also the stored output shaft position S, which has been previously stored in the SBW storage device 9a before occurrence of the instantaneous power interruption, is not destroyed, the first restarting means sets the stored output shaft position S, which is stored in the SBW storage device 9a, as the output shaft position (the latest rotational angular position of the output shaft) S after the restarting of the SBW controller 9.

The SBW controller 9 includes the second restarting means. In the case where the SBW controller 9 is restarted due to the instantaneous power interruption, when the electric motor 5 has not been operated before the instantaneous power interruption, the second restarting means sets the output shaft position (the latest rotational angular position of the output shaft) S after the restarting of the SBW control apparatus 9 based on the range demand value outputted from the shift range setting device 82.

The SBW controller 9 includes the third restarting means. In the case where the SBW controller 9 is restarted due to the instantaneous power interruption, the third restarting means sets the output shaft position A, which is stored in the AT storage device 10a, as the output shaft position (the latest rotational angular position of the output shaft) S after the restarting of the SBW controller 9.

The SBW controller 9 includes the fourth restarting means. In the case where the SBW controller 9 is restarted due to the instantaneous power interruption, the fourth restarting means notifies the AT controller 10 that the output shaft position S cannot be determined through the operation of the SBW controller 9 alone. In this way, the SBW controller 9 can obtain the output shaft position A from the AT controller 10 even when the output shaft position S cannot be obtained by the SBW controller 9 alone.

The AT controller 10 includes the fifth restarting means. When the instantaneous power interruption of the SBW controller 9 is sensed, the fifth restarting means determines the output shaft position S based on the information provided in the AT controller 10.

The AT controller 10 includes the sixth restarting means. In the case where the electric motor 5 has not been operated before the instantaneous power interruption of the SBW controller 9, when the instantaneous power interruption of the SBW controller 9 is sensed, the sixth restarting means places the automatic transmission apparatus 2 in the neutral state and sets the output shaft position A, which is stored in the AT storage device 10a, as the output shaft position (the latest rotational angular position of the output shaft) S after the restarting of the SBW controller 9.

The AT controller 10 includes the seventh restarting means. In the case where the electric motor 5 has been operated before the instantaneous power interruption of the SBW controller 9, when the instantaneous power interruption of the SBW controller 9 is sensed, the seventh restarting means requests the SBW controller 9 to specify the output shaft position S through the wall position sensing process. In this way, the SBW controller 9 executes the wall position sensing process, and thereby the output shaft position S is determined in the SBW controller 9.

Through each of the above functions, the SBW controller 9 can determine the output shaft position S (the actual shift range position) after the recovery (restarting) from the instantaneous power interruption of the SBW controller 9. As a result, the SBW controller 9 can reliably perform the change control operation for controlling the changing of the actual shift range after the instantaneous power interruption (after restarting) of the SBW controller 9.

Furthermore, the AT controller 10 can sense the occurrence of the instantaneous power interruption of the SBW controller 9 without receiving the information about the instantaneous power interruption from the SBW controller 9. Therefore, the recovery process can be started right after the occurrence of the instantaneous power interruption of the SBW controller 9 without waiting for the restarting of the SBW controller 9. As a result, it is possible to advance the control start time point after the recovery from the instantaneous power interruption of the SBW controller 9.

Second Embodiment

A second embodiment of the present invention will be described with reference to FIGS. 12 and 13. In the following description, the components similar to those of the first embodiment will be indicated by the same numerals.

In the first embodiment, the example of the process of step E7 executed by the AT controller 10 at the time of instantaneous power interruption of the SBW controller 9 includes the use of the seventh restarting means to place the automatic transmission apparatus 2 into the neutral state and to determine the output shaft position S by the execution of the wall position sensing process through the SBW controller 9.

In the second embodiment, the AT controller 10 include the eighth restarting means, which is used in the process of step E7 executed by the AT controller 10 at the time of instantaneous power interruption of the SBW controller 9. The eighth restarting means performs the following first to third steps. In the first step, the rotational direction of the electric motor 5 before the instantaneous power interruption is read. In the second step, it is determined whether the current actual shift range is the P/N range (in a group of the P range and the N range, more specifically in one of the P range and the N range) or the D/R range (in a group of the D range and the R range, more specifically in one of the D range and the R range) based on the rotational speed of the engine and the turbine rotational speed of the torque converter of the automatic transmission apparatus 2. In the third step, the output shaft position A, which has been determined before the instantaneous power interruption, is read. Based on the relationship of the first to third steps (the relationship of FIG. 13), the eighth restarting means determines the output shaft position A. The relationship of FIG. 13 is programmed in the AT controller 10 in advance.

The process executed by the AT controller 10 at the time of instantaneous power interruption of the SBW controller 9 will be described with reference to FIG. 12.

Figures 12, 13:
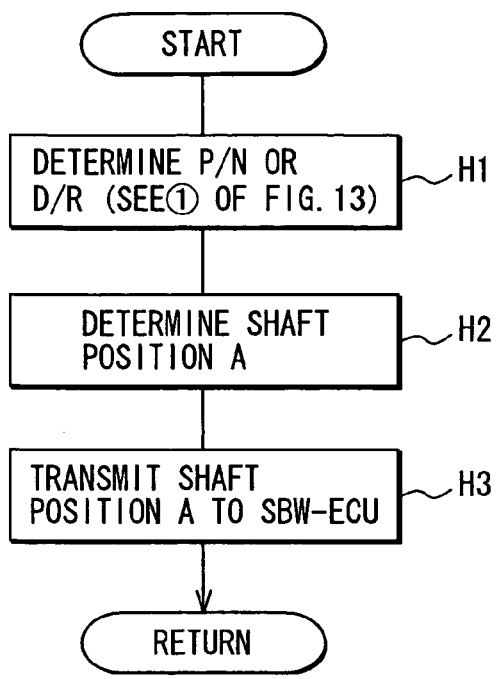
FIG. 12 is a flowchart showing a process executed in the AT controller at the time of instantaneous power interruption of the SBW controller according to a second embodiment.
FIG. 13 is a diagram showing a relationship used in the AT controller according to the second embodiment.

When the routine shown in FIG. 12 is started, it is determined whether the current operational state is the P/N range or the D/R range based on the relationship between the engine rotational speed (rpm), which is sensed with the engine rotational speed sensor, and the turbine rotational speed (rpm), which is sensed with the turbine sensor 84 at step H1. This provides the function of the above second step.

Then, at step H2, the output shaft position A is determined based on the relationship of FIG. 13.

Then, at step H3, the output shaft position A, which is determined at step H2, is transmitted to the SBW controller 9, and then the current routine shown in FIG. 12 is terminated.

As described above, in place of the seventh restarting means of the first embodiment, the eighth restarting means is used in the second embodiment. In this way, the output shaft position A can be determined in the AT controller 10 without executing the wall position sensing process after the recovery of the SBW controller 9 from the instantaneous power interruption. Therefore, the change control operation for controlling the changing of the shift range can be performed simultaneously at the time of recovery of the SBW controller 9.

Next, modifications of the above embodiments will be described.

In the second embodiment, it is determined whether the current actual shift range is the P/N range or the D/R range based on the engine rotational speed (rpm) and the turbine rotational speed (rpm). Alternatively, it is possible to determine whether the current actual shift range is the P/N range or the D/R range through any other appropriate sensing method. For example, it is possible to determine whether the current actual shift range is the P/N range or the D/R range based on the rotational speed (rpm) and the rotational direction of the output shaft of the automatic transmission apparatus 2.

In the first and second embodiments, the SR motor is used as the exemplary electric motor 5. Alternatively, another type of reluctance motor, such as a synchronous reluctance motor, may be used as the electric motor 5. Further alternatively, permanent magnet synchronous motor, such as a surface permanent magnet (SPM) motor, an interior permanent magnet (IPM) motor, may be used as the electric motor 5.

In the first and second embodiments, the sun-and-planet gear type speed reducer (a cycloid speed reducer) is used as the speed reducer 6. Alternatively, it is possible to use any other suitable sun-and-planet gear type speed reducer, which includes, for example, a sun gear, a planetary pinion and a ring gear.

In the first and second embodiments, the electric motor 5 and the speed reducer 6 are combined to form the electric actuator 1. Alternatively, it is possible to use an electric actuator 1, which directly drives the output shaft 17 by the output of the electric motor 5 without the speed reducer 6.

Furthermore, any one or more of the first to ninth restarting means described above may be combined with another one or more of the first to ninth restarting means without departing the spirit and scope of the present invention.

Additional advantages and modifications will readily occur to those skilled in the art. The invention in its broader terms is therefore not limited to the specific details, representative apparatus, and illustrative examples shown and described.

What is claimed is:

1. An automatic transmission system for a vehicle having an internal combustion engine, the automatic transmission system comprising:
   an automatic transmission apparatus that changes a rotational speed of the engine and outputs the changed rotational speed of the engine toward wheels of the vehicle;
   an automatic transmission (AT) controller that controls gear change in the automatic transmission apparatus;
   a shift range change mechanism that changes an actual shift range of the automatic transmission apparatus;
   an electric actuator that includes an electric motor and an output shaft, wherein the output shaft is driven by the electric motor to drive the shift range change mechanism;
   a shift range setting device, through which a user selects a shift range of the automatic transmission apparatus, wherein the shift range setting device outputs a range demand value that indicates the currently selected shift range; and
   a shift-by-wire (SBW) controller that controls the electric motor based on the range demand value outputted from the shift range setting device and a rotational angular position of the output shaft to drive the shift range change mechanism and thereby to change the actual shift range to the currently selected shift range, wherein:
   the SBW controller includes a shift-by-wire (SBW) storage device;
   the SBW controller stores the rotational angular position of the output shaft into the SBW storage device; and
   when the SBW controller is restarted due to instantaneous power interruption, the SBW controller maintains and uses the current angular position of the output shaft, which is stored in the SBW storage device, as a latest rotational angular position of the output shaft that is used to drive the shift range change mechanism upon satisfaction of the following conditions:
   the electric motor has not been driven before the instantaneous power interruption; and
   the current rotational angular position of the output shaft, which is stored in the SBW storage device, is not destroyed.

2. An automatic transmission system for a vehicle having an internal combustion engine, the automatic transmission system comprising:
   an automatic transmission apparatus that changes a rotational speed of the engine and outputs the changed rotational speed of the engine toward wheels of the vehicle;
   an automatic transmission (AT) controller that controls gear change in the automatic transmission apparatus;
   a shift range change mechanism that changes an actual shift range of the automatic transmission apparatus;
   an electric actuator that includes an electric motor and an output shaft, wherein the output shaft is driven by the electric motor to drive the shift range change mechanism;
   a shift range setting device, through which a user selects a shift range of the automatic transmission apparatus, wherein the shift range setting device outputs a range demand value that indicates the currently selected shift range; and
   a shift-by-wire (SBW) controller that controls the electric motor based on the range demand value outputted from the shift range setting device and a rotational angular position of the output shaft to drive the shift range change mechanism and thereby to change the actual shift range to the currently selected shift range, wherein when the SBW controller is restarted due to instantaneous power interruption, and the electric motor has not been driven before the instantaneous power interruption, the SBW controller obtains a rotational angular position of the output shaft based on the current range demand value and uses the obtained rotational angular position of the output shaft as a latest rotational angular position of the output shaft that is used to drive the shift range change mechanism.

3. An automatic transmission system for a vehicle having an internal combustion engine, the automatic transmission system comprising:
- an automatic transmission apparatus that changes a rotational speed of the engine and outputs the changed rotational speed of the engine toward wheels of the vehicle;
- an automatic transmission (AT) controller that controls gear change in the automatic transmission apparatus;
- a shift range change mechanism that changes an actual shift range of the automatic transmission apparatus;
- an electric actuator that includes an electric motor and an output shaft, wherein the output shaft is driven by the electric motor to drive the shift range change mechanism;
- a shift range setting device, through which a user selects a shift range of the automatic transmission apparatus, wherein the shift range setting device outputs a range demand value that indicates the currently selected shift range; and
- a shift-by-wire (SBW) controller that controls the electric motor based on the range demand value outputted from the shift range setting device and a rotational angular position of the output shaft to drive the shift range change mechanism and thereby to change the actual shift range to the currently selected shift range, wherein:
- the AT controller is powered through a first power supply line;
- the SBW controller is powered through a second power supply line, which is independent from the first power supply line;
- the AT controller includes an automatic transmission (AT) storage device;
- the AT controller stores a rotational angular position of the output shaft, which is recognized by the AT controller, into the AT storage device; and
- when the SBW controller is restarted due to instantaneous power interruption, the SBW controller obtains the recognized rotational angular position of the output shaft retrieved from the AT storage device of the AT controller and uses the recognized rotational angular position of the output shaft as a latest rotational angular position of the output shaft that is used to drive the shift range change mechanism.

4. An automatic transmission system for a vehicle having an internal combustion engine, the automatic transmission system comprising:
- an automatic transmission apparatus that changes a rotational speed of the engine and outputs the changed rotational speed of the engine toward wheels of the vehicle;
- an automatic transmission (AT) controller that controls gear change in the automatic transmission apparatus;
- a shift range change mechanism that changes an actual shift range of the automatic transmission apparatus;
- an electric actuator that includes an electric motor and an output shaft, wherein the output shaft is driven by the electric motor to drive the shift range change mechanism;
- a shift range setting device, through which a user selects a shift range of the automatic transmission apparatus, wherein the shift range setting device outputs a range demand value that indicates the currently selected shift range; and
- a shift-by-wire (SBW) controller that controls the electric motor based on the range demand value outputted from the shift range setting device and a rotational angular position of the output shaft to drive the shift range change mechanism and thereby to change the actual shift range to the currently selected shift range, wherein:
- when the SBW controller is restarted due to instantaneous power interruption, and the electric motor has been driven before the instantaneous power interruption, the SBW controller notifies the AT controller that the SBW controller alone is not able to determine a latest rotational angular position of the output shaft that is used to drive the shift range change mechanism.

5. An automatic transmission system for a vehicle having an internal combustion engine, the automatic transmission system comprising:
- an automatic transmission apparatus that changes a rotational speed of the engine and outputs the changed rotational speed of the engine toward wheels of the vehicle;
- an automatic transmission (AT) controller that controls gear change in the automatic transmission apparatus;
- a shift range change mechanism that changes an actual shift range of the automatic transmission apparatus;
- an electric actuator that includes an electric motor and an output shaft, wherein the output shaft is driven by the electric motor to drive the shift range change mechanism;
- a shift range setting device, through which a user selects a shift range of the automatic transmission apparatus, wherein the shift range setting device outputs a range demand value that indicates the currently selected shift range; and
- a shift-by-wire (SBW) controller that controls the electric motor based on the range demand value outputted from the shift range setting device and a rotational angular position of the output shaft to drive the shift range change mechanism and thereby to change the actual shift range to the currently selected shift range, wherein:
- the AT controller is powered through a first power supply line;
- the SBW controller is powered through a second power supply line, which is independent from the first power supply line; and
- when the AT controller senses instantaneous power interruption of the SBW controller, the AT controller determines a latest rotational angular position of the output shaft based on information present in the AT controller.

6. An automatic transmission system for a vehicle having an internal combustion engine, the automatic transmission system comprising:
- an automatic transmission apparatus that changes a rotational speed of the engine and outputs the changed rotational speed of the engine toward wheels of the vehicle;
- an automatic transmission (AT) controller that controls gear change in the automatic transmission apparatus;
- a shift range change mechanism that changes an actual shift range of the automatic transmission apparatus;
- an electric actuator that includes an electric motor and an output shaft, wherein the output shaft is driven by the electric motor to drive the shift range change mechanism;
- a shift range setting device, through which a user selects a shift range of the automatic transmission apparatus, wherein the shift range setting device outputs a range demand value that indicates the currently selected shift range; and
- a shift-by-wire (SBW) controller that controls the electric motor based on the range demand value outputted from the shift range setting device and a rotational angular position of the output shaft to drive the shift range change mechanism and thereby to change the actual shift range to the currently selected shift range, wherein:

when the AT controller senses instantaneous power interruption of the SBW controller, the AT controller determines a latest rotational angular position of the output shaft based on information present in the AT controller;

the AT controller includes an automatic transmission (AT) storage device;

the AT controller stores the determined latest rotational angular position of the output shaft into the AT storage device; and when the AT controller senses the instantaneous power interruption of the SBW controller, and the electric motor has not been driven before the instantaneous power interruption, the AT controller retrieves the latest rotational angular position of the output shaft from the AT storage device and provides the retrieved latest rotational angular position of the output shaft to the SBW controller.

7. An automatic transmission system for a vehicle having an internal combustion engine, the automatic transmission system comprising:

an automatic transmission apparatus that changes a rotational speed of the engine and outputs the changed rotational speed of the engine toward wheels of the vehicle;

an automatic transmission (AT) controller that controls gear change in the automatic transmission apparatus;

a shift range change mechanism that changes an actual shift range of the automatic transmission apparatus;

an electric actuator that includes an electric motor and an output shaft, wherein the output shaft is driven by the electric motor to drive the shift range change mechanism;

a shift range setting device, through which a user selects a shift range of the automatic transmission apparatus, wherein the shift range setting device outputs a range demand value that indicates the currently selected shift range; and a shift-by-wire (SBW) controller that controls the electric motor based on the range demand value outputted from the shift range setting device and a rotational angular position of the output shaft to drive the shift range change mechanism and thereby to change the actual shift range to the currently selected shift range, wherein:

when the AT controller senses instantaneous power interruption of the SBW controller, the AT controller determines a latest rotational angular position of the output shaft based on information present in the AT controller; and when the AT controller senses the instantaneous power interruption of the SBW controller, the AT controller places the automatic transmission apparatus into a neutral state and requests the SBW controller to perform a wall position sensing process to specify the latest rotational angular position of the output shaft.

8. An automatic transmission system for a vehicle having an internal combustion engine, the automatic transmission system comprising:

an automatic transmission apparatus that changes a rotational speed of the engine and outputs the changed rotational speed of the engine toward wheels of the vehicle;

an automatic transmission (AT) controller that controls gear change in the automatic transmission apparatus;

a shift range change mechanism that changes an actual shift range of the automatic transmission apparatus;

an electric actuator that includes an electric motor and an output shaft, wherein the output shaft is driven by the electric motor to drive the shift range change mechanism;

a shift range setting device, through which a user selects a shift range of the automatic transmission apparatus, wherein the shift range setting device outputs a range demand value that indicates the currently selected shift range; and a shift-by-wire (SBW) controller that controls the electric motor based on the range demand value outputted from the shift range setting device and a rotational angular position of the output shaft to drive the shift range change mechanism and thereby to change the actual shift range to the currently selected shift range, wherein:

when the AT controller senses instantaneous power interruption of the SBW controller, the AT controller determines a latest rotational angular position of the output shaft based on information present in the AT controller;

when the AT controller senses the instantaneous power interruption of the SBW controller, and the electric motor has been operated before the instantaneous power interruption of the SBW controller, the AT controller determines the latest rotational angular position of the output shaft based on:

a rotational direction of the electric motor before the instantaneous power interruption of the SBW controller;

the current shift range determined based on a rotational speed of the engine and a turbine rotational speed of a torque converter of the automatic transmission apparatus, wherein the current shift range is determined to fall into one of a first group of a parking (P) shift range and an a neutral (N) shift range and a second group of a drive (D) shift range and a reverse (R) shift range; and the rotational angular position of the output shaft, which is determined before the instantaneous power interruption of the SBW controller.

9. An automatic transmission system for a vehicle having an internal combustion engine, the automatic transmission system comprising:

an automatic transmission apparatus that changes a rotational speed of the engine and outputs the changed rotational speed of the engine toward wheels of the vehicle;

an automatic transmission (AT) controller that controls gear change in the automatic transmission apparatus;

a shift range change mechanism that changes an actual shift range of the automatic transmission apparatus;

an electric actuator that includes an electric motor and an output shaft, wherein the output shaft is driven by the electric motor to drive the shift range change mechanism;

a shift range setting device, through which a user selects a shift range of the automatic transmission apparatus, wherein the shift range setting device outputs a range demand value that indicates the currently selected shift range; and a shift-by-wire (SBW) controller that controls the electric motor based on the range demand value outputted from the shift range setting device and a rotational angular position of the output shaft to drive the shift range change mechanism and thereby to change the actual shift range to the currently selected shift range, wherein:

when the AT controller senses instantaneous power interruption of the SBW controller, the AT controller determines a latest rotational angular position of the output shaft based on information present in the AT controller; and when the latest rotational angular position of the output shaft is determined after the sensing of the instantaneous power interruption of the SBW controller, the AT controller determines that the SBW controller has been recovered in a normal manner.

10. A method for controlling an automatic transmission apparatus, comprising:
storing a rotational angular position of an output shaft of an electric actuator, which is driven by an electric motor of the electric actuator to drive a shift range change mechanism, into a shift-by-wire (SBW) storage device of a shift-by-wire (SBW) controller that controls the electric motor;
determining, through the SBW controller, whether the electric motor has been driven before instantaneous power interruption of the SBW controller after restarting of the SBW controller caused by the instantaneous power interruption;
determining, through the SBW controller, whether the current rotational angular position of the output shaft, which is stored in the SBW storage device, is destroyed after the restarting of the SBW controller;
maintaining the current rotational angular position of the output shaft, which is stored in the SBW storage device, as a latest rotational angular position of the output shaft after the restarting of the SBW controller upon satisfaction of the following conditions:
it is determined, through the SBW controller, that the electric motor has not been driven before the instantaneous power interruption; and
it is determined, through the SBW controller, that the current rotational angular position of the output shaft, which is stored in the SBW storage device, is not destroyed; and
controlling the electric motor of the electric actuator from the SBW controller based on a range demand value outputted from a shift range setting device and the latest rotational angular position of the output shaft to drive the shift range change mechanism and thereby to change an actual shift range of an automatic transmission apparatus to a selected shift range, which is selected by a user and is indicated by the range demand value.

11. A method for controlling an automatic transmission apparatus, comprising:
determining, through a shift-by-wire (SBW) controller, that controls an electric motor of an electric actuator, whether the electric motor, which drives an output shaft of the electric actuator to drive a shift range change mechanism and thereby to change an actual shift range of an automatic transmission apparatus, has been driven before instantaneous power interruption of the SBW controller;
obtaining a rotational angular position of the output shaft of the electric actuator through the SBW controller after restarting of the SBW controller caused by the instantaneous power interruption when it is determined, through the SBW controller, that the electric motor has not been driven before the instantaneous power interruption, wherein the obtaining of the rotational angular position of the output shaft is based on a current range demand value, which is outputted from a shift range setting device and indicates a selected shift range, which is selected by a user; and
controlling the electric motor from the SBW controller based on the range demand value outputted from the shift range setting device and the obtained rotational angular position of the output shaft to drive the shift range change mechanism and thereby to change the actual shift range of the automatic transmission apparatus to the selected shift range, which is selected by the user and is indicated by the range demand value.

12. A method for controlling an automatic transmission apparatus, comprising:
supplying electric power to an automatic transmission (AT) controller through a first power supply line and to a shift-by-wire (SBW) controller through a second power supply line, which is independent from the first power supply line;
storing a rotational angular position of an output shaft of an electric actuator, which is driven by an electric motor of the electric actuator to drive a shift range change mechanism, into an automatic transmission (AT) storage device of the AT controller that controls gear change in an automatic transmission apparatus;
obtaining the rotational angular position of the output shaft from the AT storage device and providing the obtained rotational angular position of the output shaft to the SBW controller, which controls the electric motor, when the SBW controller is restarted due to instantaneous power interruption; and
controlling the electric motor from the SBW controller based on a range demand value outputted from a shift range setting device and the obtained rotational angular position of the output shaft to drive the shift range change mechanism and thereby to change an actual shift range of the automatic transmission apparatus to a selected shift range, which is selected by a user and is indicated by the range demand value.

13. A method for controlling an automatic transmission apparatus, comprising:
determining, through a shift-by-wire (SBW) controller that controls an electric motor of an electric actuator, whether the electric motor, which drives an output shaft of the electric actuator to drive a shift range change mechanism and thereby to change an actual shift range of an automatic transmission apparatus, has been driven before instantaneous power interruption of a shift-by-wire (SBW) controller that controls the electric motor; and
notifying from the SBW controller to an automatic transmission (AT) controller, which controls gear change in an automatic transmission apparatus, that the SBW controller alone is not able to determine a latest rotational angular position of the output shaft of the electric actuator upon restarting of the SBW controller caused by the instantaneous power interruption when it is determined, through the SBW controller, that the electric motor has been driven before the instantaneous power interruption of the SBW controller.

14. A method for controlling an automatic transmission apparatus, comprising:
supplying electric power to an automatic transmission (AT) controller through a first power supply line and to a shift-by-wire (SBW) controller through a second power supply line, which is independent from the first power supply line;
determining, through the AT controller that controls gear change in the automatic transmission apparatus, whether instantaneous power interruption of the SBW controller, which controls an electric motor of an electric actuator to drive a shift range change mechanism through an output shaft of the electric actuator and thereby to change an actual shift range of an automatic transmission apparatus, has occurred; and
determining, through the AT controller, a latest rotational angular position of the output shaft based on information present in the AT controller when it is determined, through the AT controller, that the instantaneous power interruption of the SBW controller has occurred.

* * * * *

UNITED STATES PATENT AND TRADEMARK OFFICE
CERTIFICATE OF CORRECTION

| | |
|---|---|
| PATENT NO. | : 7,572,203 B2 |
| APPLICATION NO. | : 11/441203 |
| DATED | : August 11, 2009 |
| INVENTOR(S) | : Kashiwagi et al. |

Page 1 of 1

It is certified that error appears in the above-identified patent and that said Letters Patent is hereby corrected as shown below:

Title Page

Item (73) Assignee: DENSO Corporation, Kariya-city (JP)

should read: Nippon Soken, Inc., Nishio-city (JP)

Signed and Sealed this
Tenth Day of February, 2015

Michelle K. Lee
*Deputy Director of the United States Patent and Trademark Office*

UNITED STATES PATENT AND TRADEMARK OFFICE
CERTIFICATE OF CORRECTION

PATENT NO. : 7,572,203 B2  
APPLICATION NO. : 11/441203  
DATED : August 11, 2009  
INVENTOR(S) : Kashiwagi et al.

Page 1 of 1

It is certified that error appears in the above-identified patent and that said Letters Patent is hereby corrected as shown below:

Title Page

Item (73), should read; Assignee: DENSO Corporation, Kariya-city (JP);

Nippon Soken, Inc., Nishio-city (JP)

This certificate supersedes the Certificate of Correction issued February 10, 2015.

Signed and Sealed this  
Tenth Day of March, 2015

Michelle K. Lee  
*Deputy Director of the United States Patent and Trademark Office*